United States Patent
Osaki et al.

(10) Patent No.: US 9,832,640 B2
(45) Date of Patent: Nov. 28, 2017

(54) WIRELESS CONNECTION AUTHENTICATION METHOD AND SERVER

(71) Applicant: Panasonic Intellectual Property Corporation of America, Torrance, CA (US)

(72) Inventors: Yuji Osaki, Osaka (JP); Takeshi Nakayama, Hyogo (JP); Masaaki Harada, Hyogo (JP); Kunio Nakatsukasa, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 441 days.

(21) Appl. No.: 14/415,361

(22) PCT Filed: May 16, 2014

(86) PCT No.: PCT/JP2014/002579
§ 371 (c)(1),
(2) Date: Jan. 16, 2015

(87) PCT Pub. No.: WO2014/188686
PCT Pub. Date: Nov. 27, 2014

(65) Prior Publication Data
US 2015/0172923 A1  Jun. 18, 2015

(30) Foreign Application Priority Data
May 22, 2013  (JP) ................................. 2013-107711

(51) Int. Cl.
*H04L 29/06* (2006.01)
*H04W 12/06* (2009.01)
*H04W 48/20* (2009.01)
*H04W 84/12* (2009.01)

(52) U.S. Cl.
CPC ........... *H04W 12/06* (2013.01); *H04W 48/20* (2013.01); *H04W 84/12* (2013.01)

(58) Field of Classification Search
CPC ...... H04W 12/06; H04W 48/20; H04W 84/12
See application file for complete search history.

(56) References Cited

U.S. PATENT DOCUMENTS

| 7,995,468 B2 | 8/2011 | Sakai |
| 8,471,963 B2 | 6/2013 | Sakai |

(Continued)

FOREIGN PATENT DOCUMENTS

| JP | 2009-253380 | 10/2009 |
| JP | 2010-56916 | 3/2010 |

(Continued)

OTHER PUBLICATIONS

International Search Report (ISR) dated Aug. 12, 2014 in International (PCT) Application No. PCT/JP2014/002579.

*Primary Examiner* — Anthony Brown
*Assistant Examiner* — William Corum, Jr.
(74) *Attorney, Agent, or Firm* — Wenderoth, Lind & Ponack, L.L.P.

(57) ABSTRACT

A wireless connection authentication method includes: receiving first information transmitted by a first access point according to a message transmitted from a first wireless communications apparatus; receiving second information transmitted by a second access point according to a message transmitted from a second wireless communications apparatus which has already established communication with a second access point; and, if the first access point indicated in the first information and the second access point indicated in the second information are the same access point, determining the same access point as a connection destination access point of the first wireless communications apparatus.

11 Claims, 34 Drawing Sheets

(56) References Cited

U.S. PATENT DOCUMENTS

| | | |
|---|---|---|
| 8,474,020 B2 | 6/2013 | Hamachi |
| 8,611,318 B2 * | 12/2013 | Kim ...................... H04L 63/101 370/338 |
| 2006/0251256 A1 * | 11/2006 | Asokan ................. H04L 63/065 380/270 |
| 2010/0054121 A1 | 3/2010 | Sakai |
| 2010/0146129 A1 * | 6/2010 | Nakahara ............... H04W 48/12 709/228 |
| 2010/0165879 A1 * | 7/2010 | Gupta ................. H04L 12/2807 370/254 |
| 2010/0299730 A1 | 11/2010 | Hamachi |
| 2011/0255398 A1 | 10/2011 | Sakai |
| 2011/0289229 A1 | 11/2011 | Subramaniam |
| 2012/0177022 A1 * | 7/2012 | Ichikawa .............. H04W 48/08 370/338 |
| 2012/0230308 A1 | 9/2012 | Saito et al. |
| 2013/0223279 A1 * | 8/2013 | Tinnakornsrisuphap ................... H04L 41/0809 370/254 |
| 2013/0260753 A1 | 10/2013 | Sakai |
| 2013/0298194 A1 | 11/2013 | Nakajima |
| 2014/0273958 A1 * | 9/2014 | Messana ............. H04L 63/0884 455/411 |
| 2014/0328334 A1 * | 11/2014 | Viswanathan ........ H04W 12/06 370/338 |
| 2015/0019978 A1 * | 1/2015 | Shimakawa ............ G06F 3/048 715/735 |
| 2016/0105406 A1 * | 4/2016 | Smith ................... H04L 63/061 713/171 |

FOREIGN PATENT DOCUMENTS

| | | |
|---|---|---|
| JP | 2011-61574 | 3/2011 |
| JP | 2012-186516 | 9/2012 |
| JP | 2012-199905 | 10/2012 |
| JP | 2013-074606 | 4/2013 |
| JP | 2013-530601 | 7/2013 |
| JP | 2013-153533 | 8/2013 |
| JP | 2013-235342 | 11/2013 |
| JP | 2014-007634 | 1/2014 |
| WO | 2011/139962 | 11/2011 |
| WO | 2013/114434 | 8/2013 |

* cited by examiner

| ID | Random number | Access point information |
|---|---|---|
| 0001 | 12345678 | AP1 |
| 0001 | 12345678 | AP2 |

WIRELESS CONNECTION AUTHENTICATION METHOD AND SERVER

TECHNICAL FIELD

The present invention relates to a wireless connection authentication method and a server.

BACKGROUND ART

When a user uses a wireless local area network (LAN), he or she has to set wireless parameters for a wireless communications apparatus, including a network identifier (Extended Service Set Identifier (ESSID)), a frequency channel, an encryption technique, an encryption key, an authentication technique, and an authentication key. Setting these wireless parameters is troublesome for the user, and there is a technique to automatically set the wireless parameters between terminals (see Patent Literature 1, for example).

CITATION LIST

Patent Literature

[PTL 1]
Japanese Unexamined Patent Application Publication No. 2009-253380

SUMMARY OF INVENTION

Technical Problem

Of such a wireless connection authentication method, what is required is a more simple operation for the user to carry out wireless connection authentication.

Thus, the present invention aims to offer a wireless connection authentication method which allows a user to carry out wireless connection authentication by a simple operation.

Solution to Problem

A wireless connection authentication method according to an aspect of the present invention is used in a server performing wireless connection authentication for establishing communication between a first wireless communications apparatus and a wireless access point. The wireless connection authentication method includes: receiving a second message including first access point information (i) transmitted by a first wireless access point according to a first message transmitted from the first wireless communications apparatus, and (ii) indicating the first wireless access point; receiving a fourth message including second access point information (i) transmitted by a second wireless access point according to a third message transmitted from a second wireless communications apparatus which has already established communication with the second wireless access point that is same as or different from the first wireless access point, and (ii) indicating the second wireless access point; comparing the first wireless access point indicated in the first access point information with the second wireless access point indicated in the second access point information, and if the first wireless access point and the second wireless access point are a same wireless access point, determining the same wireless access point as a connection destination access point which is a wireless access point serving as a connection destination of the first wireless communications apparatus; and executing processing for wireless connection authentication between the connection destination access point and the first wireless communications apparatus.

Moreover, a wireless connection authentication method according to an aspect of the present invention is used for performing wireless connection authentication between a first wireless communications apparatus and a wireless access point. The wireless connection authentication method includes: transmitting a first message to a first wireless access point by the first wireless communications apparatus; transmitting a second message to a server by the first wireless access point that has received the first message, the second message including first access point information indicating the first wireless access point; transmitting a third message to the second wireless access point by a second wireless communications apparatus, the second wireless communications apparatus having already completed wireless connection authentication with a second wireless access point which is same as or different from the first wireless access point; transmitting a fourth message to the server by the second wireless access point that has received the third message, the fourth message including second access point information indicating the second wireless access point; comparing the first wireless access point indicated in the first access point information and the second wireless access point indicated in the second access point information, and if the first wireless access point and the second wireless access point are a same wireless access point, determining the same wireless access point as a connection destination access point which is a wireless access point serving as a connection destination of the first wireless communications apparatus, the comparing and the determining being performed by the server; and authenticating wireless connection by the connection destination access point and the first wireless communications apparatus.

It is noted that the overall and specific aspects may be implemented in the form of a system, a method, an integrated circuit, a computer program, or a recording medium such as a computer-readable CD-ROM, or any given combination thereof.

Advantageous Effects of Invention

The present invention can offer a wireless connection authentication method which allows a user to carry out wireless connection authentication by a simple operation.

UNDERLYING KNOWLEDGE FORMING BASIS IN THE PRESENT INVENTION

Figure 1:
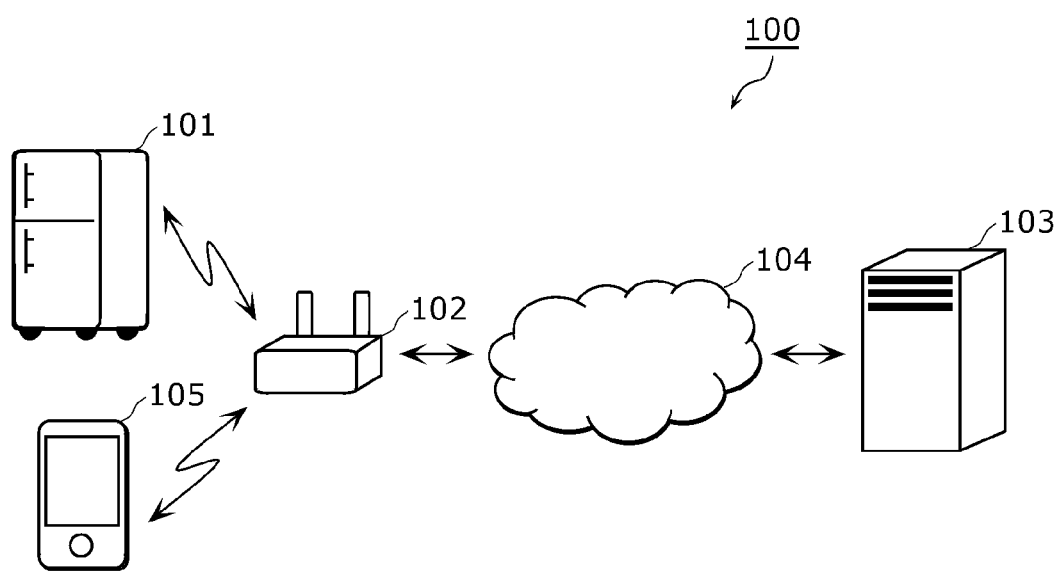
FIG. 1 is a diagram illustrating a configuration example of a communications system according to Embodiment 1.

In relation to the wireless connection authentication method disclosed in the "Background Art" section, the inventors have found the problems below.

As a method for automatically setting a wireless parameter, there is a wireless parameter automatic setting method referred to as Wi-Fi Protected Setup (WPS) defined by an association named the Wi-Fi Alliance.

In the WPS, a wireless parameter is provided from a Registrar to an Enrollee, using a Registration protocol as a special protocol for setting processing of the wireless parameter. It is noted that the Registrar is an apparatus which manages the wireless parameter and provides the wireless parameter to the Enrollee. Furthermore, the Enrollee is an apparatus which receives the wireless parameter provided from the Registrar.

Communication between the Registrar and the Enrollee with the Registration protocol is held, using an Extensible Authentication Protocol (EAP) packet. The EAP packet allows communication between the Registrar and the Enrollee, without executing encryption and authentication.

As an example, a case is described where the wireless parameter is provided from an access point operating as the Registrar to a wireless communications apparatus operating as the Enrollee. First, the wireless communications apparatus searches for a network formed by the access point, and temporarily participates in the network. At this moment, the access point and the wireless communications apparatus match each other in ESSID and frequency channel. However, the access point and the wireless communications apparatus do not match each other in encryption key and authentication key, and the access point and the wireless communications apparatus cannot hold regular data communication in which encryption and authentication are utilized.

According to the Registration protocol, the access point and the wireless communications apparatus transmit and receive a message, using the EAP packet. This makes it possible to provide the wireless parameter from the access point to the wireless communications apparatus. Since the provided wireless parameter is newly set for the wireless communications apparatus, the wireless communications apparatus can hold data communication with the access point, utilizing an encryption and authentication.

The WPS provides setting techniques including the push button technique and the PIN code technique. The push button technique allows a wireless parameter to be automatically set. However, if another access point exists in the network while the access point is setting the wireless parameter, and the other access point sets a wireless parameter by the push button technique, the wireless communications apparatus could be unintentionally connected to the other access point.

In the PIN code technique, the wireless communications apparatus will not be unintentionally connected to another access point. However, the PIN code technique has a problem of creating extra work for a user to select an access point and set a PIN code.

Hence, a technique has been proposed (see Patent Literature (PTL) 1) to improve user-friendliness, using an account management server to authenticate the user. In PTL 1, the user transmits a connection request to an access point of his or her desire. The access point that has received the connection request transmits, to an account management server, a user account of the user who has transmitted the connection request. The account management server authenticates the user and generates a PIN code, as well as manages the user account, and gives communication permission to the wireless communications apparatus by assigning the PIN code to the access point. Hence, since the account management server generates the PIN code, the user can perform wireless connection settings without setting the PIN code.

However, in the above technique, the user needs to select his or her desired access point from among access points existing in the network. This has been an extra work for the user.

Embodiments below involve authentication of a wireless communications apparatus to be newly connected to an access point, using another wireless communications apparatus which has already established a connection to the access point. This makes it possible to set a wireless parameter for the wireless communications apparatus and the access point, without selection of the access point by a user. Hence, user-friendliness can be improved.

A wireless connection authentication method according to an implementation of the present invention is used in a server performing wireless connection authentication for establishing communication between a first wireless communications apparatus and a wireless access point. The wireless connection authentication method includes: receiving a second message including first access point information (i) transmitted by a first wireless access point according to a first message transmitted from the first wireless communications apparatus, and (ii) indicating the first wireless access point; receiving a fourth message including second access point information (i) transmitted by a second wireless access point according to a third message transmitted from a second wireless communications apparatus which has already established communication with the second wireless access point that is same as or different from the first wireless access point, and (ii) indicating the second wireless access point; comparing the first wireless access point indicated in the first access point information with the second wireless access point indicated in the second access point information, and if the first wireless access point and the second wireless access point are a same wireless access point, determining the same wireless access point as a connection destination access point which is a wireless access point serving as a connection destination of the first wireless communications apparatus; and executing processing for wireless connection authentication between the connection destination access point and the first wireless communications apparatus.

Thanks to the above features, the user may carry out the following operations alone: an operation to cause the first wireless communications apparatus to transmit the first message; and an operation to cause the second wireless communications apparatus to transmit the third message. Hence, the user can carry out wireless connection authentication with simple operations.

For example, the wireless connection authentication method may further include receiving, from the second wireless communications apparatus, a first code unique to the first wireless communications apparatus. The executing of the processing may include: generating a second code using the first code, the second code being used for the wireless connection authentication between the first wireless communications apparatus and the connection destination access point; and transmitting the second code to the connection destination access point.

This contributes to preventing an unintended device from being inadvertently authenticated.

For example, each of the first message and the second message further may include a third code, and, in the generating of the second code, the second code may be generated using the first code and the third code.

This contributes to preventing an unintended device from being inadvertently authenticated.

Moreover, a wireless connection authentication method according to an implementation of the present invention is used for performing wireless connection authentication between a first wireless communications apparatus and a wireless access point. The wireless connection authentication method includes: transmitting a first message to a first wireless access point by the first wireless communications apparatus; transmitting a second message to a server by the first wireless access point that has received the first message, the second message including first access point information indicating the first wireless access point; transmitting a third message to the second wireless access point by a second wireless communications apparatus, the second wireless communications apparatus having already completed wireless connection authentication with a second wireless access point which is same as or different from the first wireless access point; transmitting a fourth message to the server by the second wireless access point that has received the third message, the fourth message including second access point information indicating the second wireless access point; comparing the first wireless access point indicated in the first access point information and the second wireless access point indicated in the second access point information, and if the first wireless access point and the second wireless access point are a same wireless access point, determining the same wireless access point as a connection destination access point which is a wireless access point serving as a connection destination of the first wireless communications apparatus, the comparing and the determining being performed by the server; and authenticating wireless connection by the connection destination access point and the first wireless communications apparatus.

Thanks to the above features, the user may carry out the following operations alone: an operation to cause the first wireless communications apparatus to transmit the first message; and an operation to cause the second wireless communications apparatus to transmit the third message. Hence, the user can carry out wireless connection authentication with simple operations.

For example, the wireless connection authentication method may further include: obtaining a first code by the second wireless communications apparatus according to a user operation, the first code being unique to the first wireless communications apparatus; transmitting the first code by the second wireless communications apparatus to the server; generating a second code by the server using the first code, the second code being used for the wireless connection authentication between the first wireless communications apparatus and the connection destination access point; transmitting the second code to the connection destination access point by the server; and generating a fourth code by the first wireless communications apparatus, using a third code which is same as the first code, wherein in the authenticating, the first wireless communications apparatus and the connection destination access point may authenticate the wireless connection between the first wireless communications apparatus and the connection destination access point according to whether or not the second code and the fourth code are same.

This contributes to preventing an unintended device from being inadvertently authenticated.

For example, the wireless connection authentication method may further include generating a fifth code by the first wireless communications apparatus, wherein each of the first message and the second message may further include the fifth code, in the generating of the second code, the second code may be generated using the first code and the fifth code, and, in the generating of the fourth code, the fourth code may be generated using the third code and the fifth code.

This contributes to preventing an unintended device from being inadvertently authenticated.

For example, the transmitting of the third message may be executed after the transmitting of the first message.

For example, the wireless connection authentication method may further include transmitting a wireless signal by the first wireless communications apparatus after the transmitting of the first message, wherein in the transmitting of the third message, the second wireless communications apparatus may transmit the third message to the second wireless access point if the second wireless communications apparatus receives the wireless signal.

This contributes to preventing the third message from being inadvertently transmitted.

For example, the transmitting of the first message may be executed after the transmitting of the third message.

In addition, a server according to an implementation of the present invention authenticates wireless connection for establishing communication between a first wireless communications apparatus and a wireless access point. The server includes: a first receiving unit which receives a second message including first access point information (i) transmitted by a first wireless access point according to a first message transmitted from the first wireless communications apparatus, and (ii) indicating the first wireless access point; a second receiving unit which receives a fourth message including second access point information (i) transmitted by a second wireless access point according to a third message transmitted from a second wireless communications apparatus which has already established communication with the second wireless access point that is same as or different from the first wireless access point, and (ii) indicating the second wireless access point; >a determining unit which compares the first wireless access point indicated in the first access point information with the second wireless access point indicated in the second access point information, and if the first wireless access point and the second wireless access point are a same wireless access point, determines the same wireless access point as a connection destination access point which is a wireless access point serving as a connection destination of the first wireless communications apparatus; and an authentication processing unit which executes processing for wireless connection authentication between the connection destination access point and the first wireless communications apparatus.

Thanks to the above features, the user may carry out the following operations alone: an operation to cause the first wireless communications apparatus to transmit the first message; and an operation to cause the second wireless communications apparatus to transmit the third message. Hence, the user can carry out wireless connection authentication with simple operations.

It is noted that these overall and specific aspects may be implemented in the form of a system, a method, an integrated circuit, a computer program, or a recording medium such as a computer-readable CD-ROM, or any given combination thereof.

Embodiments in the present invention will be described below, with reference to the drawings.

It is noted that any of the embodiments described below are specific examples in the present invention. The numerical values, shapes, materials, constituent elements, arrangement positions of and connecting schemes between the constituent elements, steps, and an order of the steps all described in the embodiments are examples, and shall not limit the present invention. Among the constituent elements in the embodiments below, those not described in an independent claim representing the most generic concept of the present invention are introduced as arbitrary ones.

DESCRIPTION OF EMBODIMENTS

Embodiment 1

FIG. 1 is a diagram illustrating a configuration example of a communications system 100 typically described according to this embodiment. This communications system 100 includes: wireless communications apparatuses 101 and 105; an access point 102; a server 103; and the Internet 104.

The wireless communications apparatus 101 is a communications device having a wireless-LAN communication function and a WPS function. An example of the wireless communications apparatus 101 is a personal computer or a home appliance having a wireless communication function. The access point 102 has a wireless LAN function and a WPS function. The server 103 has a function to manage an account (such as an ID and an authentication code) of a wireless communications apparatus, and functions to authenticate the wireless communications apparatus and give communication permission to the wireless communications apparatus. The Internet 104 is a communications network connectable to the computers all over the world. The wireless communications apparatus 105 is a communications device which has already established a connection with the access point 102 via a wired or wireless LAN. An example of the wireless communications apparatus 105 is a personal computer, a cellular phone, a smart phone, or a tablet computer. Hereinafter, an example is described of the wireless communications apparatus 105 to be connected with the access point 102 via the wireless LAN.

The access point 102 and the server 103 are connected with each other via the Internet 104. The wireless communications apparatus 101 and the wireless communications apparatus 105 are connected to a wireless network created by the access point 102 and configured in infrastructure mode. The wireless communications apparatus 105 has already established a connection to the access point 102, and is permitted to connect to the Internet 104 using an encryption.

The wireless communications apparatus 101 and the access point 102 set respective PIN codes. Then, the wireless communications apparatus 101 starts a wireless parameter automatic setting application. Then, by a setting information notification protocol, matching is confirmed between the respective PIN codes held in the wireless communications apparatus 101 and the access point 102. Hence, the wireless communications apparatus 101 can obtain a wireless parameter. In other words, a PIN code is either code information to be used for setting processing of the wireless parameter or code information to be used for determining whether or not the wireless parameter is allowed to be provided in the setting processing of the wireless parameter.

Here, for the setting information notification protocol, an EAP packet is used to transmit and receive various messages. Thus, if the wireless communications apparatus 101 and the access point 102 match each other in ESSID and frequency channel to be used, various messages can be transmitted and received by the setting information notification protocol without an encryption and authentication of the wireless LAN. Hence, the wireless communications apparatus 101 can communicate with the access point 102 alone until the authentication succeeds. Furthermore, the communication between the wireless communications apparatus 101 and the server 103 is held by the access point 102 forwarding the messages. The wireless communications apparatus 101 can be connected to the Internet 104, only when the authentication with the server 103 succeeds.

Figure 2:
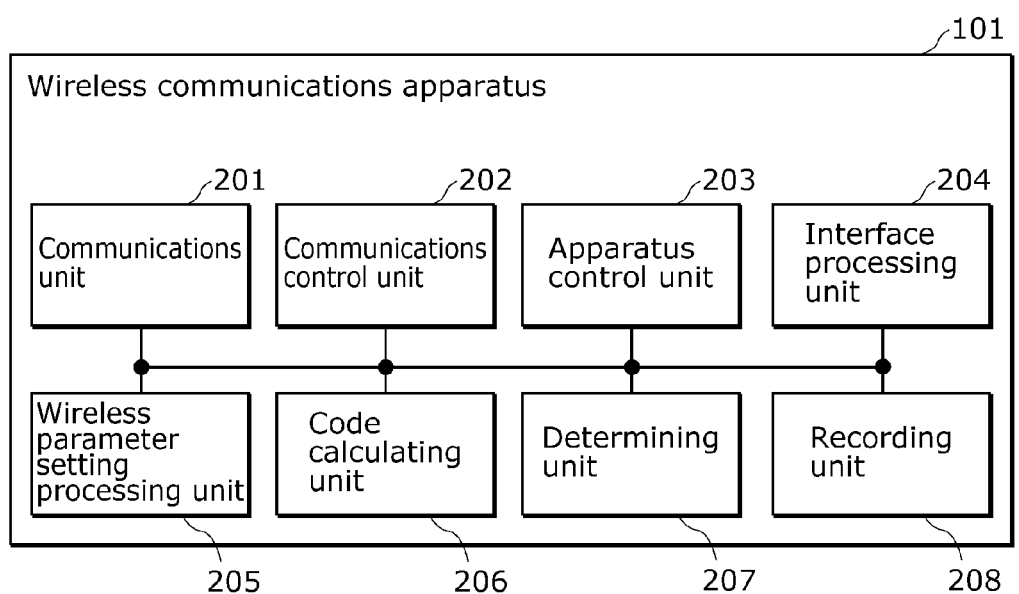
FIG. 2 is a block diagram illustrating a configuration example of a wireless communications apparatus according to Embodiment 1.

The configuration of the wireless communications apparatus 101 illustrated in FIG. 1 is described with reference to FIG. 2. FIG. 2 is a block diagram illustrating a configuration example of the wireless communications apparatus 101 according to this embodiment. The wireless communications apparatus 101 illustrated in FIG. 2 includes: a communications unit 201; a communications control unit 202; an apparatus control unit 203; an interface processing unit 204; a wireless parameter setting processing unit 205; a code calculating unit 206; a determining unit 207; and a recording unit 208.

The communications unit 201 holds wireless communication. The communications control unit 202 controls the communications unit 201. The apparatus control unit 203 controls the entire operation of the wireless communications apparatus 101. The interface processing unit 204 controls various interfaces. The wireless parameter setting processing unit 205 executes wireless parameter setting processing, using a setting information notification protocol. The code calculating unit 206 calculates various signals, hash values, and so on. The determining unit 207 makes determinations on various kinds of processing. The recording unit 208 records a wireless parameter, account information, an ID, an authentication code, and so on.

Figure 3:
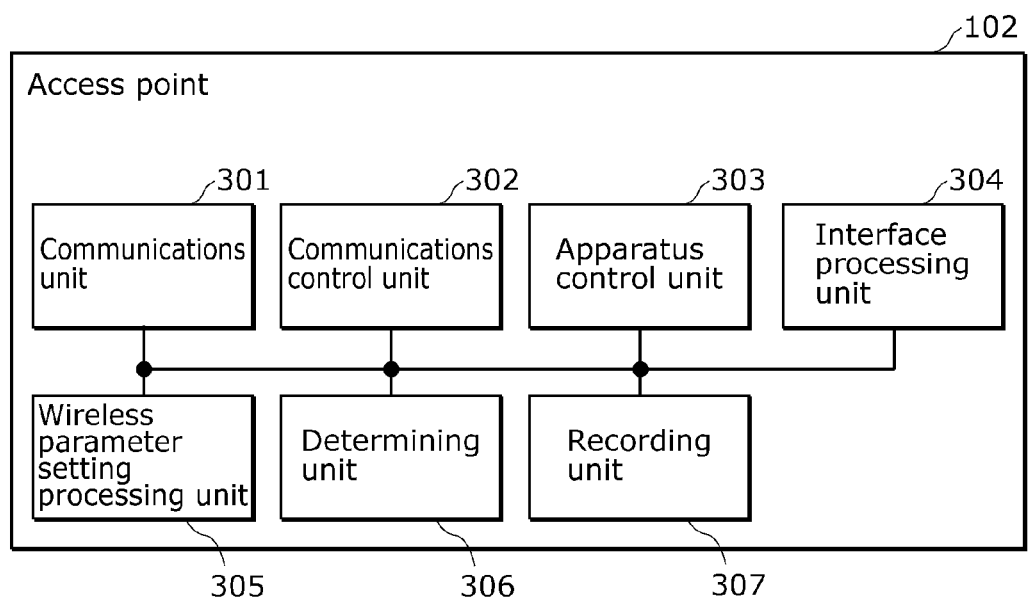
FIG. 3 is a block diagram illustrating a configuration example of an access point according to Embodiment 1.

The configuration of the access point 102 illustrated in FIG. 1 is described with reference to FIG. 3. FIG. 3 is a block diagram illustrating a configuration example of the access point 102 according to this embodiment. The access point 102 illustrated in FIG. 3 includes: a communications unit 301; a communications control unit 302; an apparatus control unit 303; an interface processing unit 304; a wireless parameter setting processing unit 305; a determining unit 306; and a recording unit 307.

The communications unit 301 holds wireless communication. The communications control unit 302 controls the communications unit 301. The apparatus control unit 303 controls the entire operation of an apparatus (the access point 102). The interface processing unit 304 controls various interfaces. The wireless parameter setting processing unit 305 executes wireless parameter setting processing, using a setting information notification protocol. The determining unit 306 makes determinations on various kinds of processing. The recording unit 307 records a wireless parameter, account information, an Internet Protocol (IP) address of a server, and so on.

Figure 4:
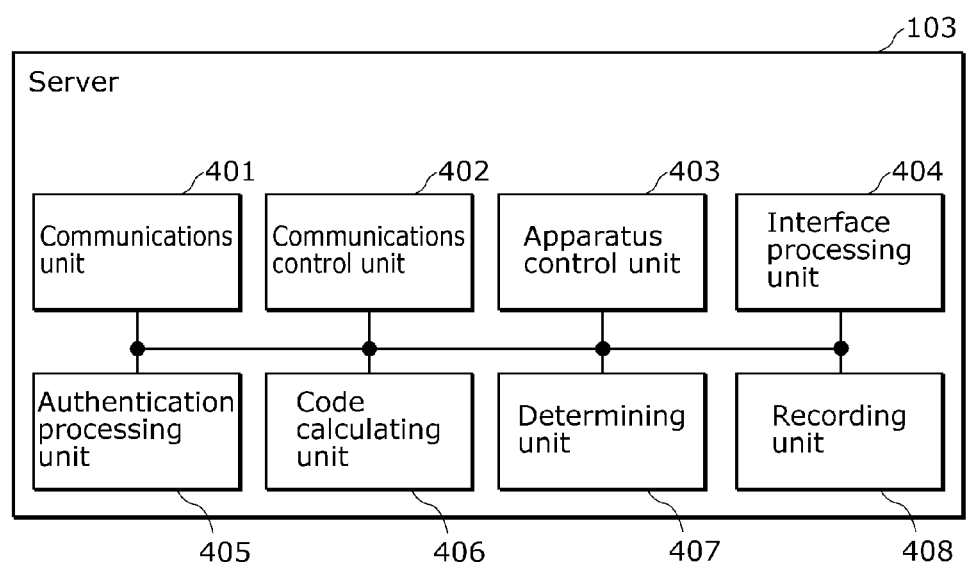
FIG. 4 is a block diagram illustrating a configuration example of a server according to Embodiment 1.

The configuration of the server 103 illustrated in FIG. 1 is described with reference to FIG. 4. FIG. 4 is a block diagram illustrating a configuration example of the server 103 according to this embodiment. The server 103 illustrated in FIG. 4 includes: a communications unit 401; a communications control unit 402; an apparatus control unit 403; an interface processing unit 404; an authentication processing unit 405; a code calculating unit 406; a determining unit 407; and a recording unit 408.

The communications unit 401 holds wireless communication. The communications control unit 402 controls the communications unit 401. The apparatus control unit 403 controls the entire operation of an apparatus (the server 103). The interface processing unit 404 controls various interfaces. The authentication processing unit 405 executes various kinds of authentication processing. The code calculating unit 406 calculates various signals, hash values, and so on. The determining unit 407 makes determinations on various kinds of processing. The recording unit 408 records a wireless parameter, account information, an authentication code, and so on.

Figure 5:
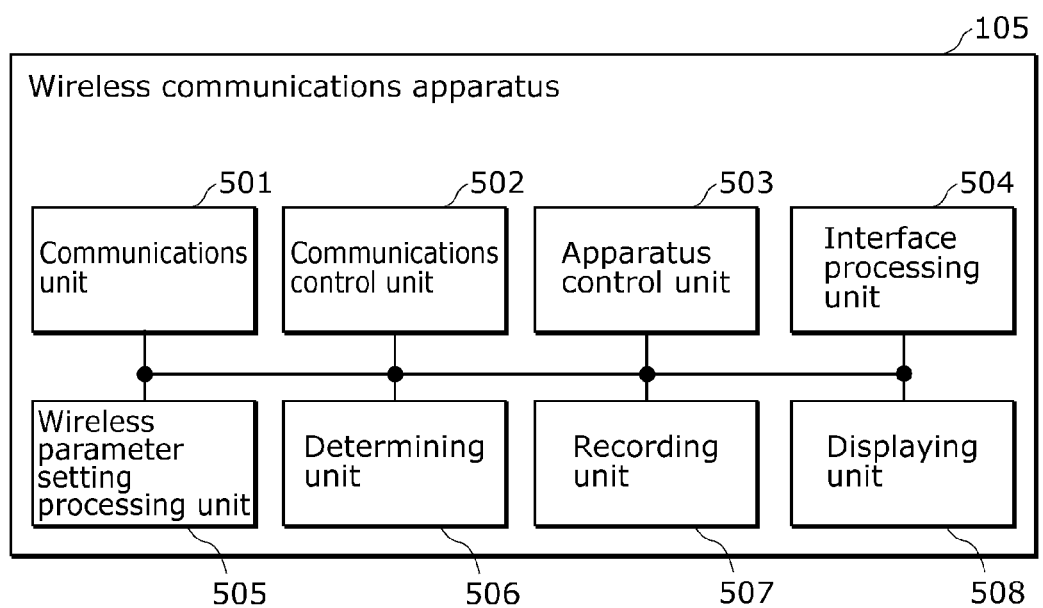
FIG. 5 is a block diagram illustrating a configuration example of a wireless communications apparatus which has already established communication with the access point according to Embodiment 1.

The configuration of the wireless communications apparatus 105 illustrated in FIG. 1 is described with reference to FIG. 5. The wireless communications apparatus 105 has already established a connection to the access point 102. FIG. 5 is a block diagram illustrating a configuration example of the wireless communications apparatus 105 that has already established a connection with the access point 102 according to this embodiment. The wireless communications apparatus 105 illustrated in FIG. 5 includes: a communications unit 501; a communications control unit 502; an apparatus control unit 503; an interface processing unit 504; a wireless parameter setting processing unit 505; a determining unit 506; a recording unit 507; and a displaying unit 508.

The communications unit 501 holds wireless communication. The communications control unit 502 controls the communications unit 501. The apparatus control unit 503 controls the entire operation of the wireless communications apparatus 105. The interface processing unit 504 controls various interfaces. The wireless parameter setting processing unit 505 executes wireless parameter setting processing, using a setting information notification protocol. The determining unit 506 makes determinations on various kinds of processing. The recording unit 507 records a wireless parameter, account information, and so on. The displaying unit 508 presents various displays.

Next, an account authentication sequence executed among the wireless communications apparatus 101, the access point 102, the server 103, and the wireless communications apparatus 105 is described with reference to FIGS. 6 and 7.

Figure 6:
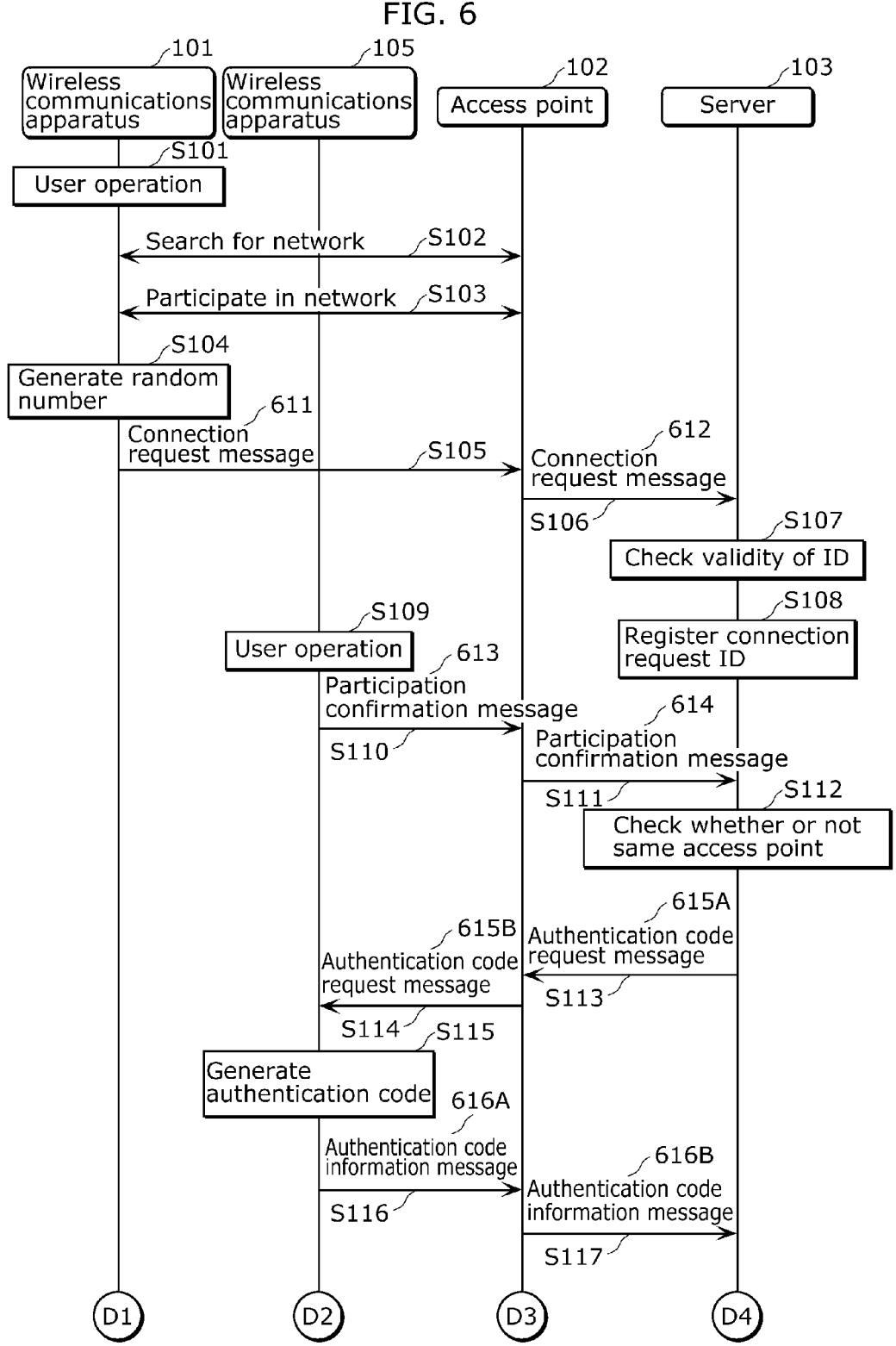
FIG. 6 is a sequence diagram of account authentication processing according to Embodiment 1.
Figure 7:
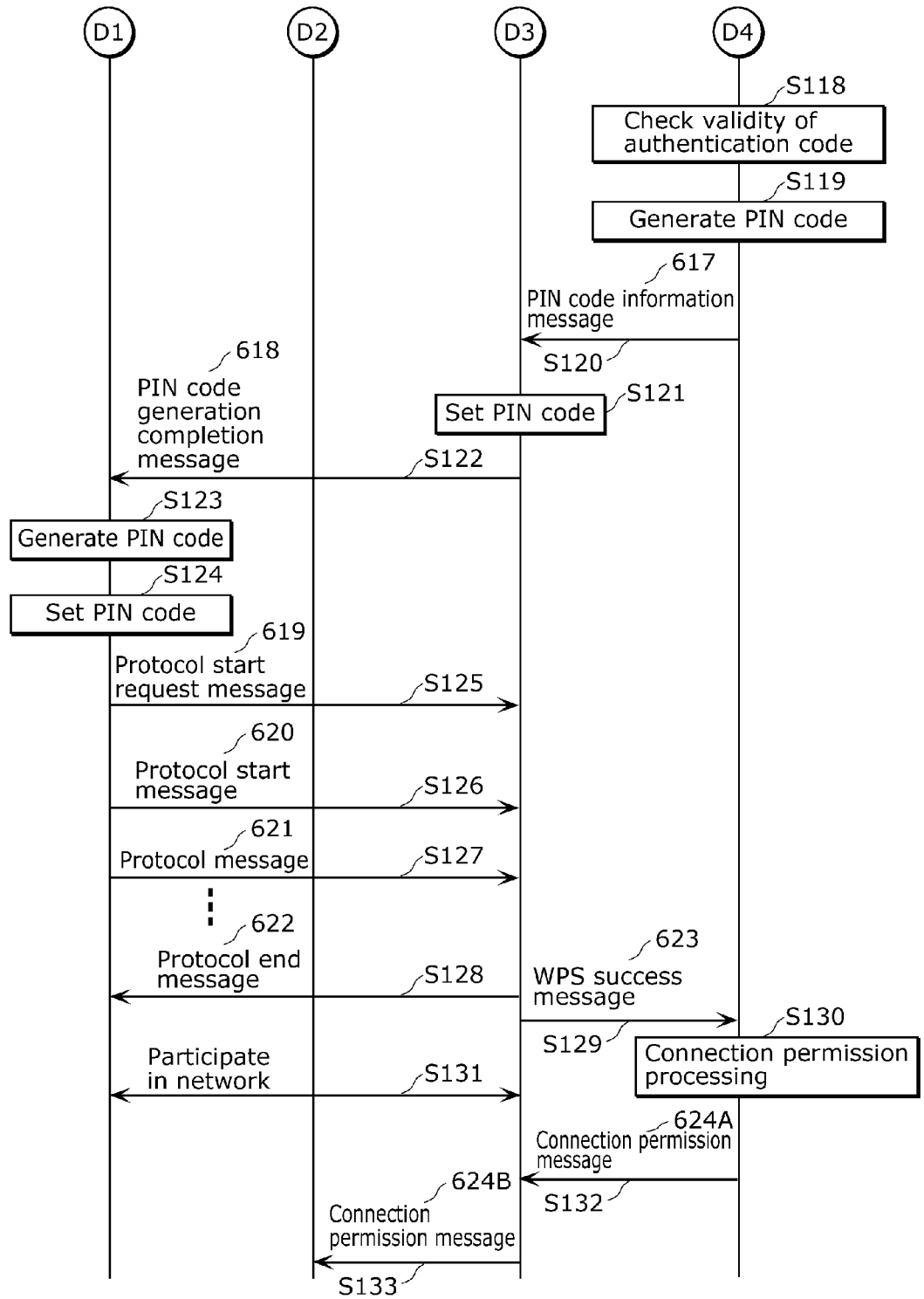
FIG. 7 is a sequence diagram of account authentication processing according to Embodiment 1.

FIGS. 6 and 7 are sequence diagrams illustrating an account authentication sequence according to this embodiment.

Figure 8:
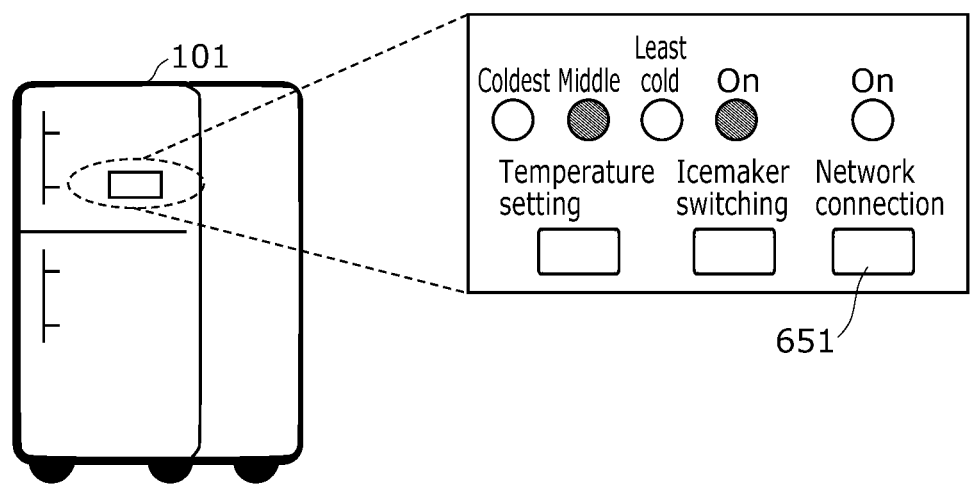
FIG. 8 is a diagram for describing an example operation for a network connection request according to Embodiment 1.

First, on the wireless communications apparatus 101, a wireless parameter automatic setting application is started by a user operation and so on (S101). FIG. 8 is a diagram illustrating an example operation by the user. For example, the user presses an operation button 651 provided to the wireless communications apparatus 101 (a refrigerator, for example). The operation button 651 is used for a network connection. This starts the wireless parameter automatic setting application.

When the above operation is performed, the wireless communications apparatus 101 searches for wireless networks nearby (S102). Next, the wireless communications apparatus 101 sequentially selects the multiple wireless networks that have been searched for, and participates in one of the selected wireless network. In this example, the wireless network of the access point 102 is selected, and the wireless communications apparatus 101 participates in the wireless network of the access point 102 (S103). However, at this moment, none of an encryption key, an authentication key, and so on is set in common for the wireless communications apparatus 101 and the access point 102. Hence, in the wireless network of the access point 102, the wireless communications apparatus 101 is in a state where communication with the access point 102 is possible only through a specific signal (a broadcast signal, an EAP packet, and so on). Thus, the wireless communications apparatus 101 cannot hold regular data communication in which encryption and authentication are utilized. Here, an EAP packet is used to transmit and receive various messages between the wireless communications apparatus 101 and the access point 102.

Next, the wireless communications apparatus 101 generates a random number (S104). Then, the wireless communications apparatus 101 transmits to the access point 102 a connection request message 611 including the random number and an ID (S105).

Figure 9:
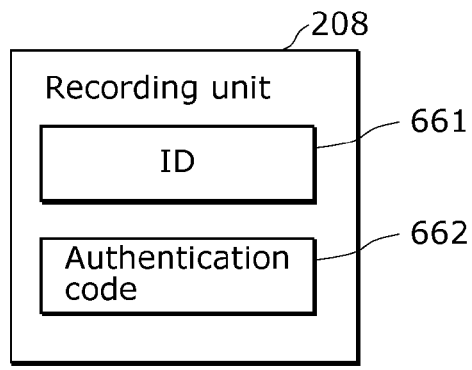
FIG. 9 is a diagram illustrating an example of information stored in the wireless communications apparatus according to Embodiment 1.

FIG. 9 is a diagram illustrating an example of information recorded on the recording unit 208 included in the wireless communications apparatus 101. As illustrated in FIG. 9, the recording unit 208 records an ID 661 and an authentication code 662.

The ID 661 is an identifier for identifying the wireless communications apparatus 101. For example, the ID 661 is a model number, a product serial number, or a combination thereof. It is noted that the ID 661 may be a combination of any given numbers or letters.

The authentication code 662 is an identifier for identifying the wireless communications apparatus 101. For example, the authentication code 662 is a model number, a product serial number, or a combination thereof. It is noted that the authentication code 662 may be a combination of any given numbers or letters. Furthermore, here, the ID 661 and the authentication code 662 are separately described; however, only one of the ID 661 and the authentication code 662 may be used. In other words, the ID 661 and the authentication code 662 may be the same codes (identifiers).

Figure 10:
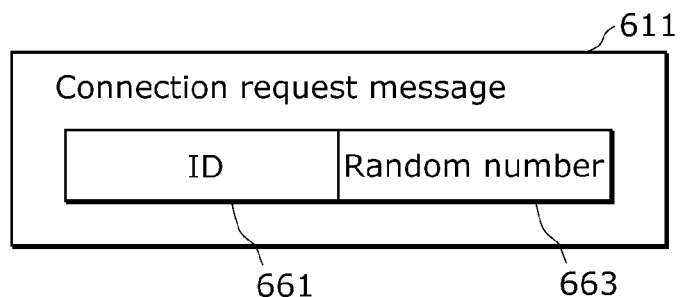
FIG. 10 is a diagram illustrating a configuration example of a connection request message according to Embodiment 1.

FIG. 10 is a diagram illustrating a configuration example of a connection request message 611. The connection request message 611 is a message of the wireless communications apparatus 101 requesting the server 103 that the wireless communications apparatus 101 be connected to the network. In other words, the connection request message 611 is a message of the wireless communications apparatus 101 requesting the server 103 that the wireless communications apparatus 101 be connected to the access point 102. This connection request message 611 includes the ID 661 recorded on the recording unit 208 and a random number 663 generated in a step S104.

It is noted that, as necessary, the connection request message 611 includes information other than the above information (for example, information indicating the kind of the message, information indicating a transmission source and a transmission destination of the message, and so on); however, such kinds of information is not shown in FIG. 10. Moreover, after-described various messages are similar to the connection request message 611 in that the various messages also include these kinds of information.

When the access point 102 receives the connection request message 611, the access point 102 adds access point information 664 to the received connection request message 611 to generate a connection request message 612, and transmits the generated connection request message 612 to the server 103 (S106).

Figure 11:
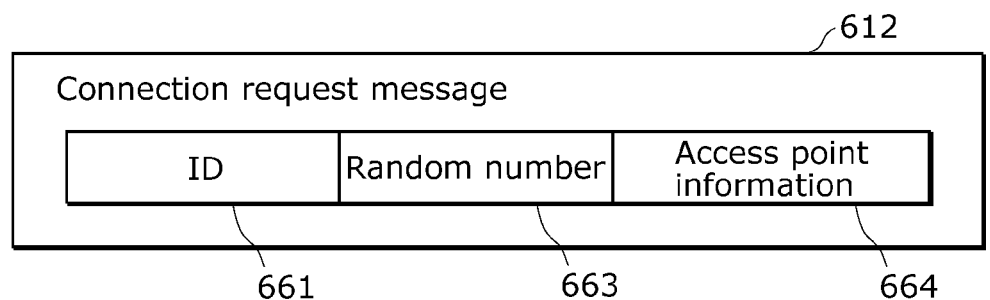
FIG. 11 is a diagram illustrating a configuration example of a connection request message according to Embodiment 1.

FIG. 11 is a diagram illustrating a configuration example of the connection request message 612. As illustrated in FIG. 11, the connection request message 612 includes: the ID 661 and the random number 663 included in the connection request message 611; and the access point information 664. The access point information 664 indicates an access point which is the transmission source of the connection request message 612. Hence, in this example, the access point information 664 indicates the access point 102.

It is noted that the example described here is that the access point 102 adds the access point information 664 to the connection request message 611. Instead, the wireless communications apparatus 101 may generate the connection request message 611 including the access point information 664. Here, the access point information 664 indicates an access point which is the transmission destination of the connection request message 611.

When the server 103 receives the connection request message 612, the server 103 checks validity of the ID 661 included in the received connection request message 612 (S107). If the ID 661 is valid, the server 103 registers the wireless communications apparatus 101, having the received ID 661, as a terminal which has a connection request to the access point 102 (S108).

Here, if multiple wireless networks are searched for in the step S102, the steps S103 and S105 are executed on each of multiple access points. Hence, the server 103 receives multiple connection request messages 612 via different access points. For example, if the access point 102 (AP1) and an access point 102A (AP2) exist near the wireless communications apparatus 101 as illustrated in FIG. 12, the server 103 receives respective connection request messages 612 via the access point 102 and the access point 102A.

Figures 12, 13:
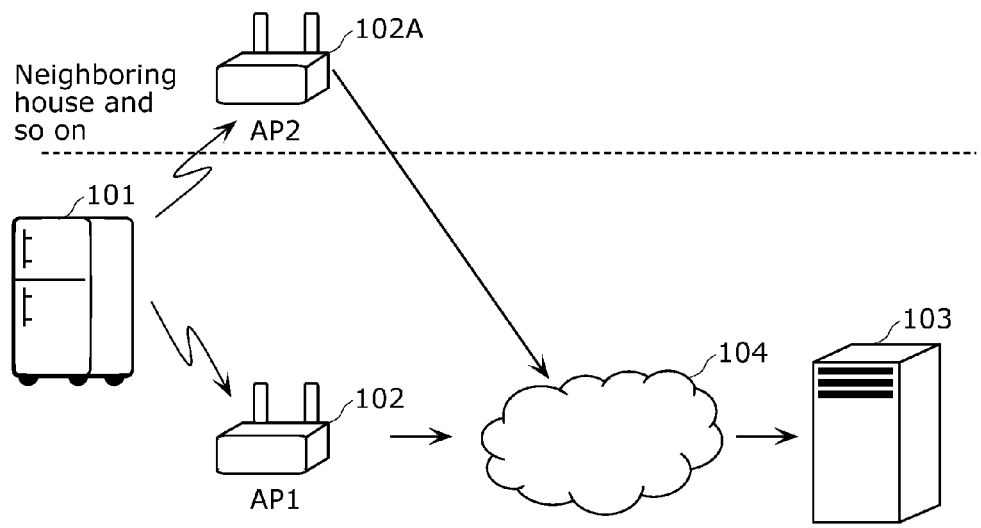
FIG. 12 is a diagram illustrating how a connection request message according to Embodiment 1 is transmitted.
FIG. 13 is a diagram illustrating an example of information stored in the server according to Embodiment 1.

In this case, as illustrated in FIG. 13, information (an ID 671, a random number 672, and access point information 673) corresponding to the two connection request messages 612 is registered on the server 103. Here, since the two connection request messages 612 are routed through different access points, the access points indicated in the access point information 673 are different. It is noted that, in FIG. 13, the two connection request messages 612 have the same ID 671 and random number 672; however, at least one of the ID 671 and the random number 672 may be different.

Figure 14:
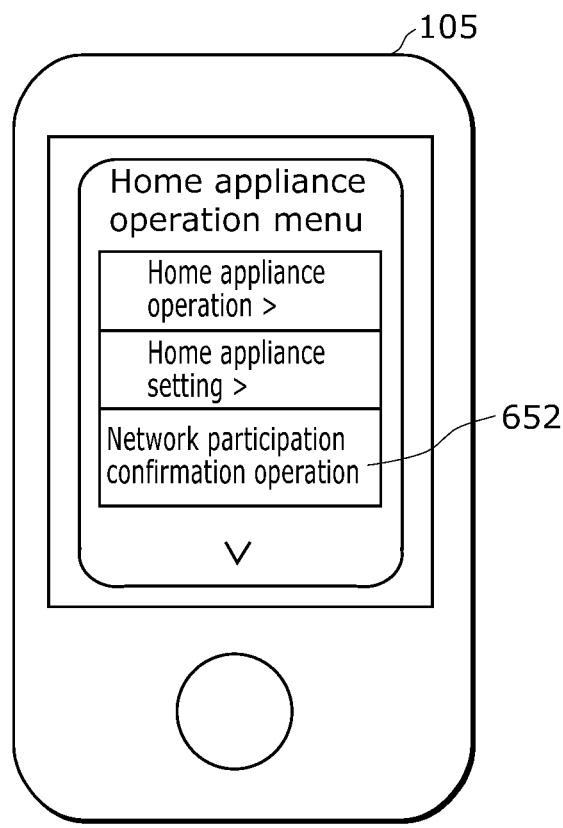
FIG. 14 is a diagram for describing an example operation for a network participation confirmation request according to Embodiment 1.

Next, on the wireless communications apparatus 105 that has already established a connection to the access point 102, a participation registration application is started by a user operation, and so on (S109). FIG. 14 is a diagram illustrating an example operation by the user. For example, on the wireless communications apparatus 105 (a smartphone, for example), the user selects an operation menu 652 for making a network participation confirmation. Hence, the participation registration application is started.

Next, the wireless communications apparatus 105 transmits a participation confirmation message 613 to the access point 102 (S110). When the access point 102 receives the participation confirmation message 613, the access point 102 adds access point information 665 to the participation confirmation message 613 to generate a participation confirmation message 614, and transmits the generated participation confirmation message 614 to the server 103 (S111).

Figure 15:
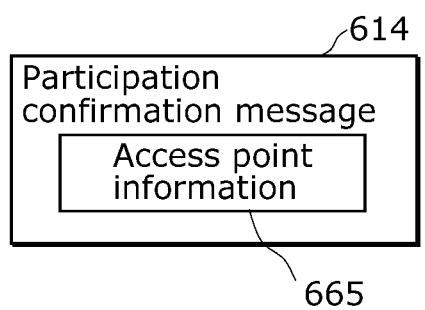
FIG. 15 is a diagram illustrating a configuration example of a participation confirmation message according to Embodiment 1.

FIG. 15 is a diagram illustrating a configuration example of the participation confirmation message 614. As illustrated in FIG. 15, the participation confirmation message 614 includes the access point information 665. The access point information 665 indicates an access point which is the transmission source of the participation confirmation message 614. Hence, in this example, the access point information 665 indicates the access point 102.

It is noted that the example described here is that the access point 102 adds the access point information 665 to the participation confirmation message 614. Instead, the wireless communications apparatus 105 may generate the participation confirmation message 613 including the access point information 665. Here, the access point information 665 indicates an access point which is the transmission destination of the participation confirmation message 613.

Moreover, in either case, the access point information 665 indicates the access point 102 with which the wireless communications apparatus 105 has already established communication. The access point information 665 indicates the access point 102 that is the connection destination of the wireless communications apparatus 101.

When the server 103 receives the participation confirmation message 614, the server 103 checks whether or not there is a terminal which has a connection request to the access point 102. Specifically, the server 103 checks whether or not there is the access point information 673 indicating the same access point as an access point indicated in the access point information 665 included in the participation confirmation message 614 (S112).

For example, when the AP1 (the access point 102) and the AP2 (the access point 102A) are registered as the access point information 673 as illustrated in FIG. 13, the server 103 determines that the AP1 (the access point 102) indicated in the access point information 665 is the connection destination of the wireless communications apparatus 101.

Next, the server 103 transmits an authentication code request message 615A to the access point 102 determined as the connection destination (S113). When the access point 102 receives the authentication code request message 615A, the access point 102 transmits an authentication code request message 615B to the wireless communications apparatus 105 (S114).

Figure 16:
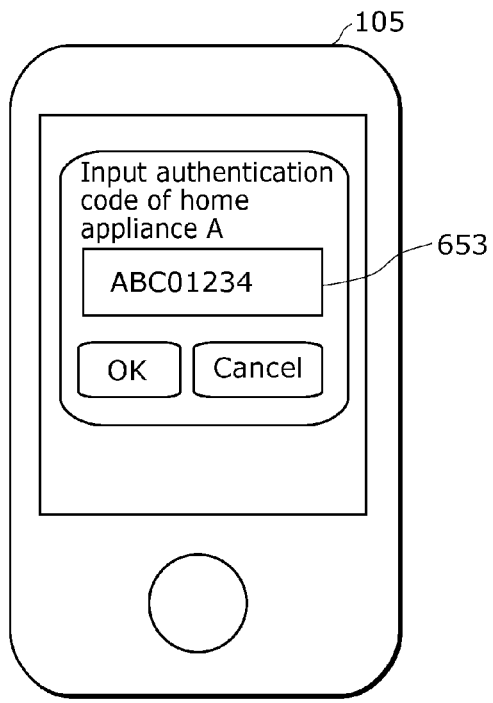
FIG. 16 is a diagram illustrating an example of an operation for inputting an authentication code according to Embodiment 1.

When the wireless communications apparatus 105 receives the authentication code request message 615B, the wireless communications apparatus 105 generates an authentication code according to a user operation and so on (S115). As illustrated in FIG. 16, for example, the user inputs an authentication code into an input menu 653. Here, the authentication code to be inputted is a number or a character string unique to the wireless communications apparatus 101, and is the same as the authentication code 662 recorded on the recording unit 208 of the wireless communications apparatus 101. For example, the user checks an authentication code found on a housing or in a user's manual and so on of the wireless communications apparatus 101 (a home appliance, for example), and inputs the authentication code into the input menu 653.

It is noted that the user may capture an image of a barcode or a matrix barcode and so on found on the housing or in the user's manual and so on of the wireless communications apparatus 101, using the wireless communications apparatus 105 (a smartphone, for example). Hence, the wireless communications apparatus 105 can obtain the authentication code.

Figure 17:
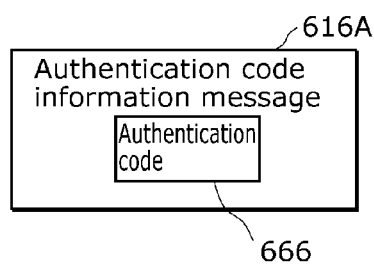
FIG. 17 is a diagram illustrating a configuration example of an authentication code information message according to Embodiment 1.

Next, the wireless communications apparatus 105 transmits an authentication code information message 616A to the access point 102 (S116). FIG. 17 is a diagram illustrating a configuration example of the authentication code information message 616A. As illustrated in FIG. 17, the authentication code information message 616A includes an authentication code 666 generated in a step S115.

When the access point 102 receives the authentication code information message 616A, the access point 102 transmits, to the server 103, an authentication code information message 6163 including the authentication code 666 included in the authentication code information message 616A (S117). For example, a configuration example of the authentication code information message 616B is the same as the configuration example of the authentication code information message 616A illustrated in FIG. 17.

When the server 103 receives the authentication code information message 616B, the server 103 checks validity of the authentication code 666 included in the received authentication code information message 616B (S118). If the authentication code 666 is valid, the server 103 generates a PIN code for setting a wireless parameter of the wireless communications apparatus 101, working as a terminal which has a connection request to the access point 102, using the random number 663 included in the connection request message 612 and the authentication code 666 included in the authentication code information message 616B (S119).

Figure 18:
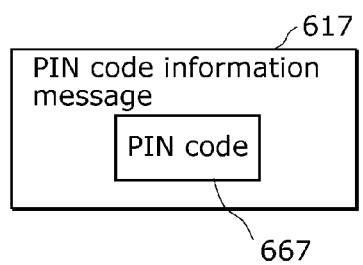
FIG. 18 is a diagram illustrating a configuration example of a personal identification number (PIN) code information message according to Embodiment 1.

Next, as illustrated in FIG. 18, the server 103 transmits, to the access point 102, a PIN code information message 617 including a generated PIN code 667 (S120). When the access point 102 receives the PIN code information message 617, the access point 102 starts the wireless parameter automatic setting application and sets the added PIN code 667 to the wireless parameter automatic setting application (S121). After the access point 102 sets the PIN code, the access point 102 transmits a PIN code generation completion message to the wireless communications apparatus 101 (S122).

When the wireless communications apparatus 101 receives a PIN code generation completion message 618, the wireless communications apparatus 101 generates a PIN code, using the random number generated in the step S104 and the authentication code 662 recorded on the recording unit 208 (S123). Next, the wireless communications apparatus 101 sets the generated PIN code to the wireless parameter automatic setting application (S124). Then, in order to start the setting information notification protocol, the wireless communications apparatus 101 transmits a protocol start request message 619 to the access point 102.

When the access point 102 receives the protocol start request message 619 from the wireless communications apparatus 101, the access point 102 transmits a protocol start message 620 to the wireless communications apparatus 101 (S126). Then, the wireless communications apparatus 101 and the access point 102 exchange a protocol message 621 according to a Registration protocol of the WPS (S127). Here the wireless parameter of the access point 102 is transmitted to the wireless communications apparatus 101 and the transmitted wireless parameter is set for the wireless communications apparatus 101, only when matching is confirmed, between the PIN code set for the wireless communications apparatus 101 and the PIN code set for the access point 102, for both the wireless communications apparatus 101 and the access point 102.

Next, after the setting information notification protocol ends, the access point 102 transmits a protocol end message 622 to the wireless communications apparatus 101 (S128), and a WPS success message 623 to the server 103 (S129). When the server 103 receives the WPS success message 623, the server 103 executes processing to permit the wireless communications apparatus 101 to connect to the Internet (S130).

When the wireless communications apparatus 101 receives the protocol end message 622, the wireless communications apparatus 101 once exits the network. Then, the wireless communications apparatus 101 connects to the wireless network of the access point 102 again, using the parameter obtained from the access point 102 (S131). Here, the wireless communications apparatus 101 has an encryption key, an authentication key, and so on set in common with those for the access point 102. Hence, the wireless communications apparatus 101 can hold regular data communication, utilizing encryption and authentication.

Figure 19:
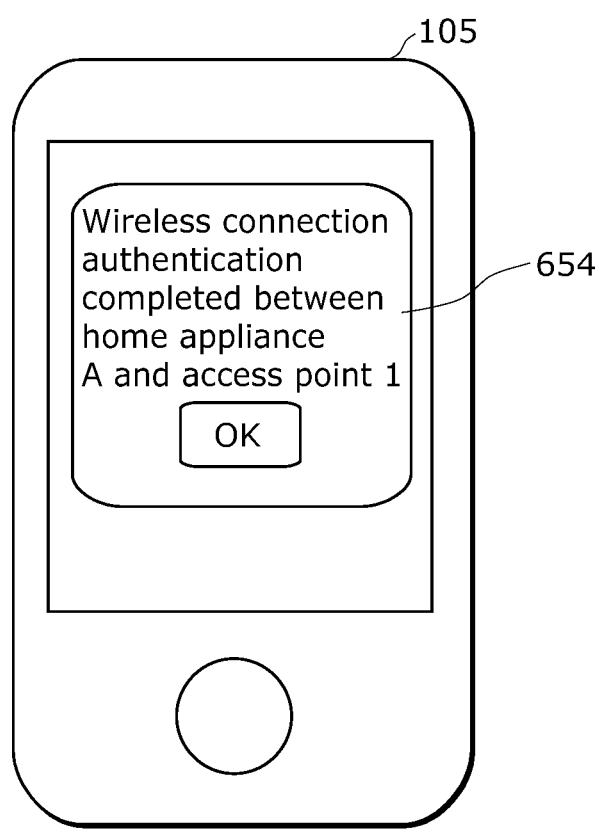
FIG. 19 is a diagram illustrating a display example when the wireless connection authentication according to the Embodiment 1 ends.

Furthermore, after the server 103 executes processing to permit the connection, the server 103 transmits a connection permission message 624A to the access point 102 (S132). When the access point 102 receives the connection permission message 624A, the access point 102 transmits a connection permission message 624B to the wireless communications apparatus 105 (S133). When the wireless communications apparatus 105 receives the connection permission message 624B, the wireless communications apparatus 105 displays, for example, a message 654 illustrated in FIG. 19 and presents the user with the completion of the wireless connection authentication between the wireless communications apparatus 101 and the access point 102.

As described above, the communications system 100 according to this embodiment executes wireless connection authentication between the wireless communications apparatus 101 and the access point 102. Specifically, the wireless communications apparatus 101 transmits the connection request message 611 to a first wireless access point (the access point 102 or the access point 102A) (S105). The access point 102 (or the access point 102A) that has received the connection request message 611 transmits the connection request message 612 to the server 103 (S106). Here, the connection request message 612 includes the access point information 664 indicating the first wireless access point.

Next, the wireless communications apparatus 105 transmits the participation confirmation message 613 to a second wireless access point (the access point 102) (S110). Here, the wireless communications apparatus 105 has already completed wireless connection authentication with the second wireless access point that is the same as or different from the first wireless access point. The second wireless access point that has received the participation confirmation message 613 transmits the participation confirmation message 614 to the server 103 (S111). Here, the participation confirmation message 614 includes the access point information 665 indicating the second wireless access point.

Then, the server 103 compares the first wireless access point indicated in the access point information 664 with the second wireless access point indicated in the access point information 665. As a result, if the first wireless access point and the second wireless access point are the same wireless access point, the server 103 determines the same wireless access point as a connection destination access point which is a wireless access point serving as the connection destination of the wireless communications apparatus 101 (S112).

Finally, the connection destination access point and the wireless communications apparatus 101 authenticate wireless connection (S125 to S128).

As described above, even though there are multiple wireless access points (for example, the access points 102 and 102A) with which the wireless communications apparatus 101 can communicate, the server 103 can appropriately determine a wireless access point to be connected (the access point 102) with the wireless communications apparatus 101, using the access point information 665 transmitted by the wireless access point to be connected (the access point 102) according to the participation confirmation message 613 transmitted from the wireless communications apparatus 105.

Furthermore, the user may carry out the following operations alone: an operation to cause the wireless communications apparatus 101 to transmit the connection request message 611, and an operation to cause the wireless communications apparatus 105 to transmit the participation confirmation message 613. For example, the user may perform simple operations, such as pressing the operation button 651 provided to the wireless communications apparatus 101 (a refrigerator) as illustrated in FIG. 8, and then selecting the operation menu 652 on the wireless communications apparatus 105 (a smartphone) as illustrated in FIG. 14. Hence, the wireless connection authentication method according to this embodiment allows the user to perform wireless connection authentication by a simple operation.

In contrast, when the user selects an access point of his or her desire from among multiple access points which exist in a network, it might be difficult for the user to appropriately select the desired access point if the user is not familiar with setting and so on of a device.

Moreover, a wireless communications device (for example, a home appliance) and an access point might be separately located from each other when the user operates a button and so on provided to the access point. In such a case, the user has a problem of extra work since the user has to operate both the separately-located wireless communication device and access point. Furthermore, the user might not be able to easily operate a button and so on provided to the access point, depending on an installation location of the access point, in this embodiment, in contrast, the user may use, for example, his or her smartphone. This contributes to reducing the user's extra work.

Furthermore, this embodiment contributes to reducing the cost of the entire system, since there is no need to provide a button and so on to an access point. Moreover, since user operations are simplified, occurrence of unnecessary operations by an unfamiliar user can be reduced. This contributes to reducing unnecessary power consumption, as well as curbing deterioration or malfunction of a device.

Hence, this embodiment involves setting a wireless parameter of a terminal to be newly connected to a network, using a terminal which has already established a connection to a desired access point. Furthermore, the server 103 determines whether or not information indicating the same access point is included in a message transmitted from the terminal to be newly connected to the network and in a message transmitted from the terminal that has already established the connection to the desired access point.

Hence, a connection to an unintended access point can be prevented even though there are multiple access points which can wirelessly communicate. Moreover, the user does not have to select an access point, which contributes to an improvement in user-friendliness.

In addition, the wireless communications apparatus 105 obtains the authentication code 666 (a first code) according to a user operation (S115). Here, the authentication code 666 is unique to the wireless communications apparatus 101. Next, the wireless communications apparatus 105 transmits the authentication code 666 to the server 103 (S116 and S117). Specifically, the wireless communications apparatus 105 transmits, to the server 103, the authentication code information message 616A (616B) including the authentication code 666 via the access point 102.

Furthermore, the server 103 generates the PIN code 667 (a second code), using the authentication code 666 (S119). The PIN code 667 is used for authentication of wireless connection between the wireless communications apparatus 101 and a connection destination access point (the access point 102). Next, the server 103 transmits the PIN code 667 to the access point 102 (S120).

Moreover, the wireless communications apparatus 101 generates a PIN code (a fourth code), using the authentication code 662 (a third code) that is the same as the authentication code 666 (S123). The wireless communications apparatus 101 and the access point 102 authenticate wireless connection therebetween according to whether or not the authentication code 662 and the authentication code generated by the wireless communications apparatus 101 are the same (S125 to S128).

Hence, in a wireless LAN, the same PIN codes are safely and automatically set for the wireless communications apparatus 101 and the access point 102. Furthermore, two PIN codes are generated, using the authentication code 662 held by the wireless communications apparatus 101 and the authentication code 666 that the user has inputted into the wireless communications apparatus 105. This contributes to preventing an unintended device from being inadvertently authenticated.

Furthermore, the wireless communications apparatus 101 generates the random number 663 (a fifth code) (S104). Moreover, each of the connection request messages 611 and 612 includes the random number 663.

The server 103 generates the PIN code 667, using the authentication code 666 and the random number 663 (S119). The wireless communications apparatus 101 generates an authentication code, using the authentication code 662 and the random number 663 (S123).

Hence, a PIN code to be set is generated, using a random number and an authentication code. Thus, a different PIN code is generated for each setting. This contributes to an improvement in safety. Moreover, the safety of the authentication code is high, since the authentication code is communicated only in an encrypted network.

In addition, the wireless communications apparatus 105 (for example, a smartphone) is used for inputting an authentication code, instead of the wireless communications apparatus 101 (for example a home appliance) to be newly connected to the network. This makes it possible to set a wireless parameter for the wireless communications apparatus 101 that does not have a keyboard or a touch panel and lacks sufficient user interfaces.

Next, a flow of processing for each of apparatuses is described. First, a processing sequence is described of how the wireless communications apparatus 101 executes a setting information notification protocol, with reference to FIG. 20.

Figure 20:
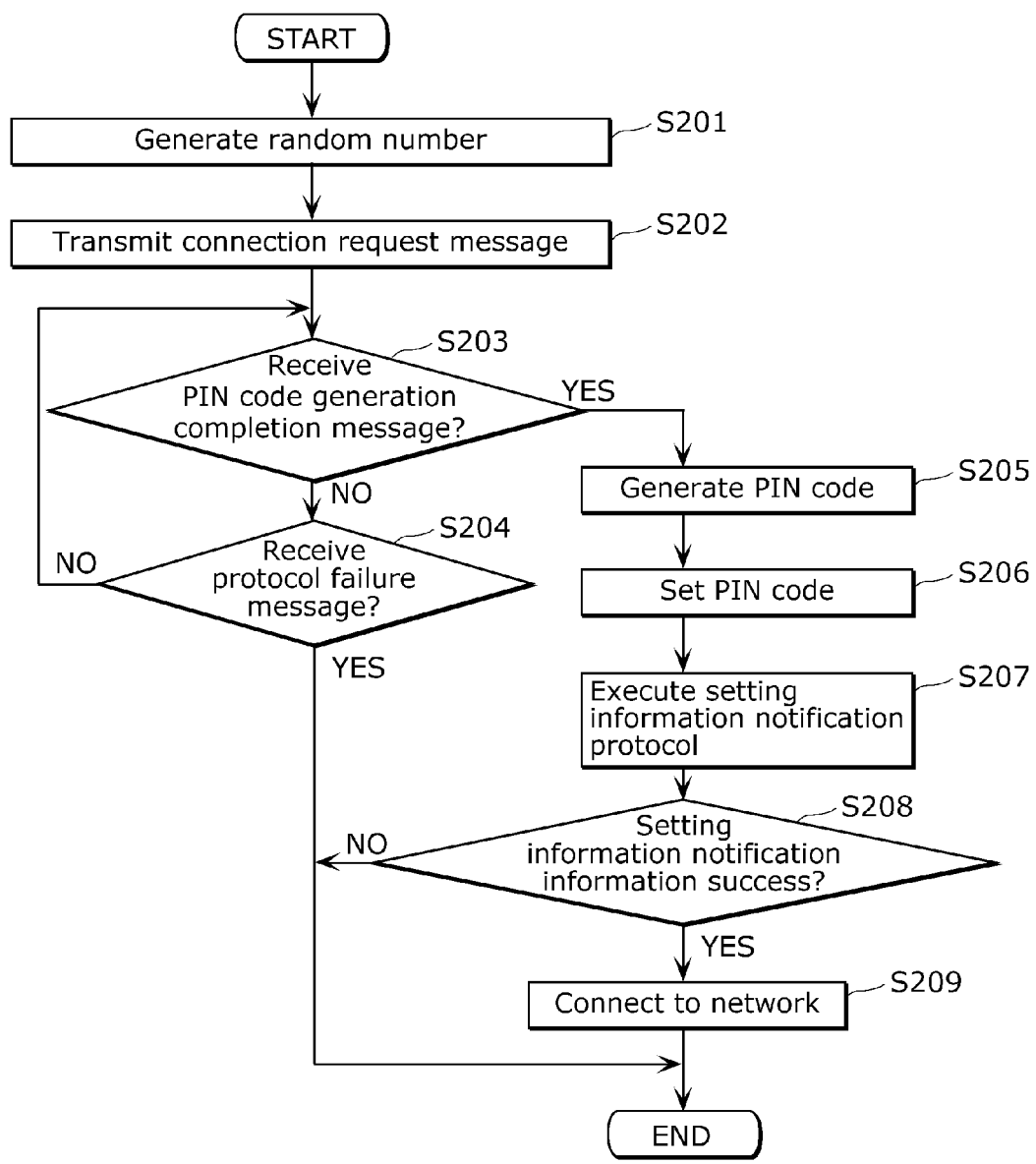
FIG. 20 is a flowchart illustrating processing by the wireless communications apparatus according to Embodiment 1.

FIG. 20 is a flowchart illustrating processing by the wireless communications apparatus 101 according to this embodiment. It is noted that the processing is started when the wireless communications apparatus 101 connects to a wireless network constructed by the access point 102. It is noted that, at this moment, none of an encryption key, an authentication key, and so on is set in common for the wireless communications apparatus 101 and the access point 102. Hence, in the wireless network of the access point 102, the wireless communications apparatus 101 is in a state where communication with the access point 102 is possible only through a specific signal (a broadcast signal, an EAP packet, and so on). Thus, the wireless communications apparatus 101 cannot hold regular data communication, utilizing encryption and authentication. Here, EAP packets are used to transmit and receive various messages between the wireless communications apparatus 101 and the access point 102.

First, the wireless communications apparatus 101 generates the random number 663 required for generation of a PIN code (S201). Then, the wireless communications apparatus 101 transmits, to the access point 102, the connection request message 611 including the random number 663 and the ID 661 (S202). After the wireless communications apparatus 101 transmits the connection request message 611, the wireless communications apparatus 101 either receives the PIN code generation completion message 618 from the access point 102 or stands by until the wireless communications apparatus 101 receives a protocol failure message (S203 and S204). If the wireless communications apparatus 101 receives the protocol failure message (S204: YES), the wireless communications apparatus 101 finishes the processing.

Furthermore, if the wireless communications apparatus 101 receives the PIN code generation completion message 618 (S203: YES), the wireless communications apparatus 101 generates the PIN code using the authentication code 662 (a password) and the previously generated random number 663 (S205). As a method to generate the PIN code, any given method, such as a method utilizing a cryptographic algorithm or a hash algorithm, may be applied.

After the wireless communications apparatus 101 generates the PIN code, the wireless communications apparatus 101 sets the PIN code for the wireless parameter automatic setting application (S206). Then, the wireless communications apparatus 101 executes the setting information notification protocol, using the set PIN code (S207). In the setting information notification protocol, the Enrollee and the Registrar authenticate their validity by determining whether or not respective PIN codes of the Enrollee and the Registrar match. Thus, the Enrollee can obtain the wireless parameter from the Registrar having a PIN code which is the same as the PIN code of the Enrollee.

After the wireless communications apparatus 101 finishes the setting information notification protocol, the wireless communications apparatus 101 determines whether or not setting information notification protocol has succeeded (S208). Here, the success of the setting information notification protocol means completion of the obtainment of the wireless parameter from the Registrar holding the PIN code that matches the PIN code of the Enrollee. If the setting information notification protocol fails (S208: NO), the wireless communications apparatus 101 finishes the processing.

In contrast, if the setting information notification protocol succeeds (S208: YES), the wireless communications apparatus 101 connects to the wireless network constructed by the access point 102, using the obtained wireless parameter (S209). Thus, the wireless communications apparatus 101 has an encryption key, an authentication key, and so on set in common with those for the access point 102. Hence, the wireless communications apparatus 101 can hold regular data communication, utilizing encryption and authentication.

Figure 21:
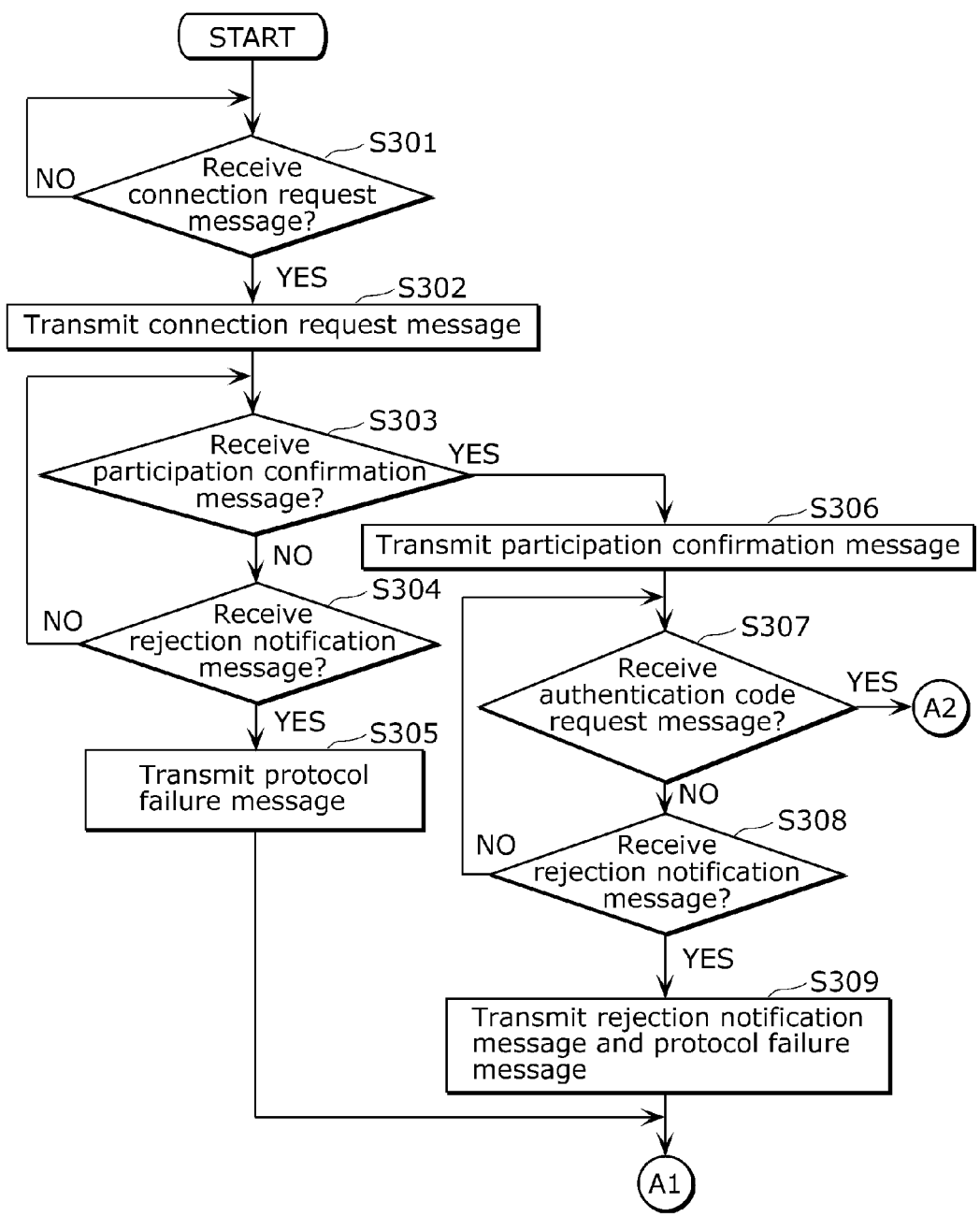
FIG. 21 is a flowchart illustrating processing by the access point according to Embodiment 1.
Figure 22:
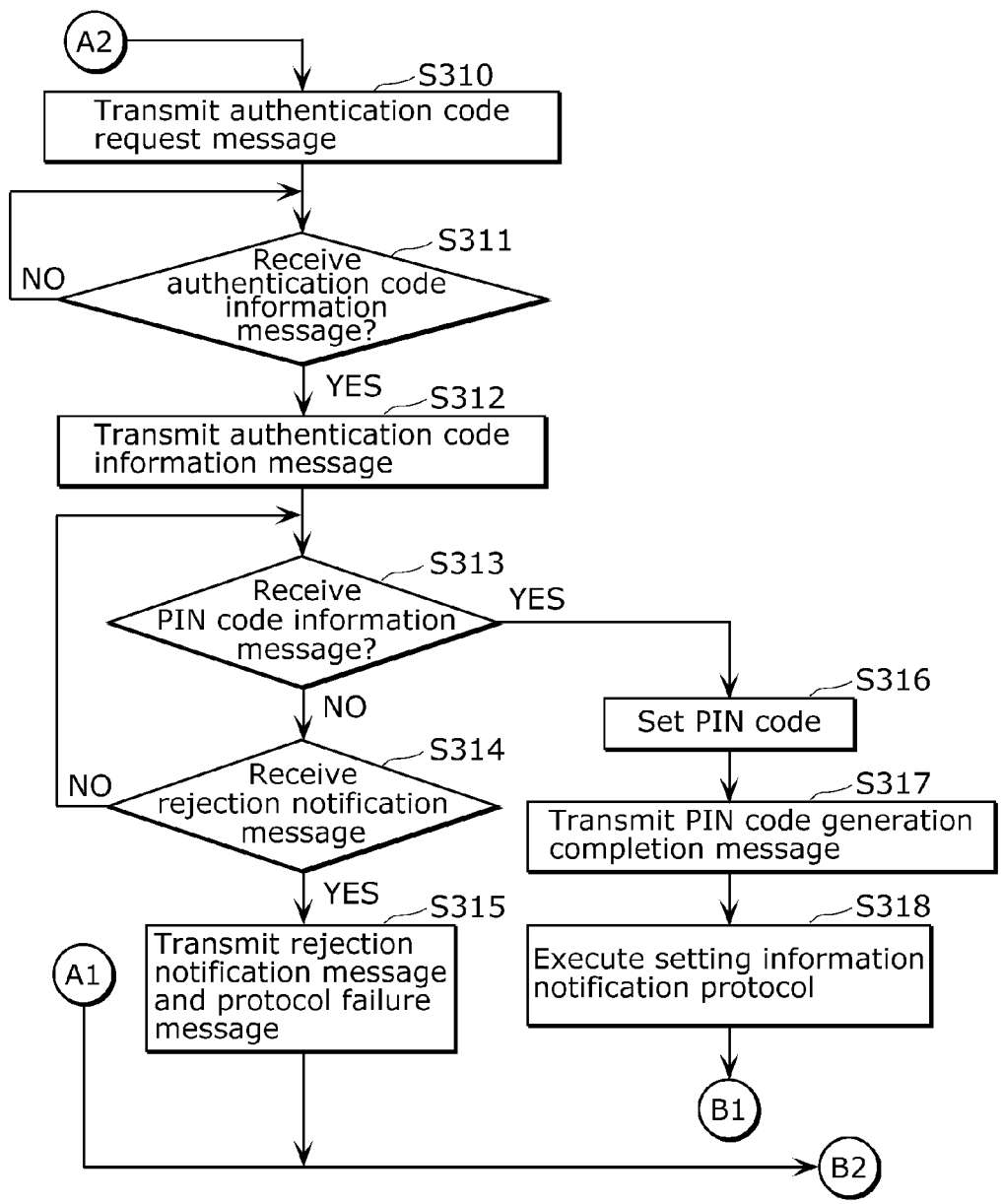
FIG. 22 is a flowchart illustrating processing by the access point according to Embodiment 1.
Figure 23:
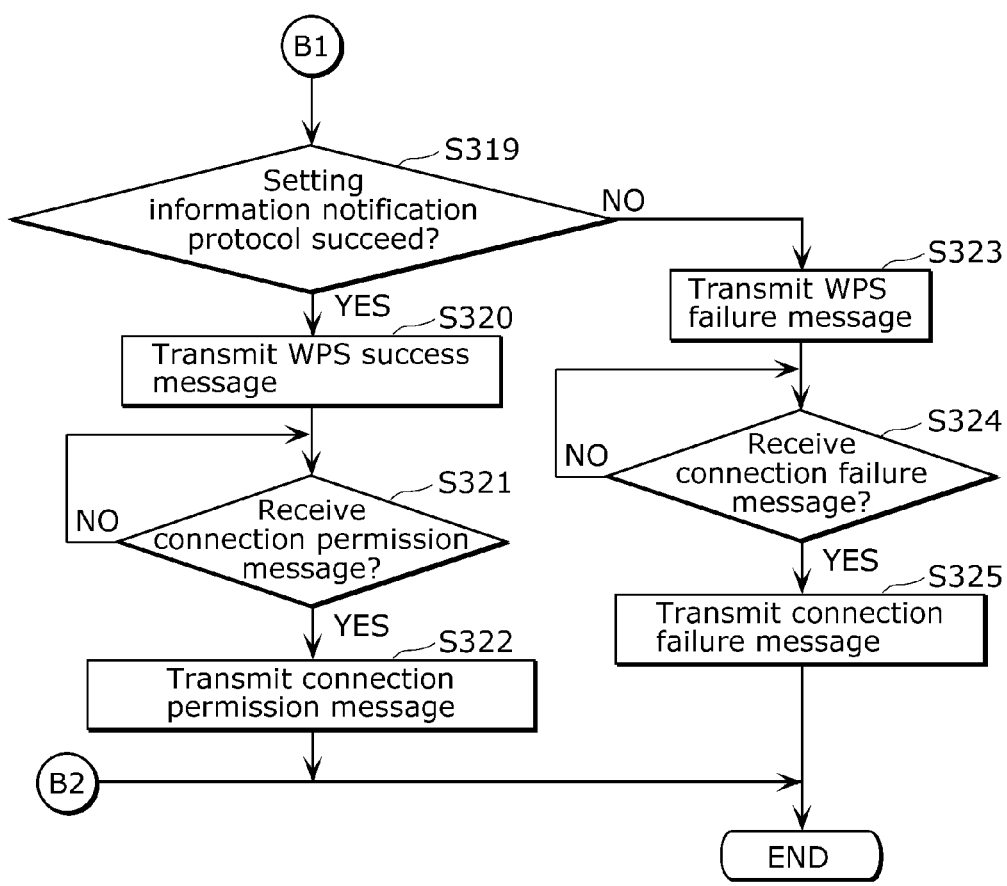
FIG. 23 is a flowchart illustrating processing by the access point according to Embodiment 1.

Next, a processing sequence is described of how the access point 102 executes the setting information notification protocol, with reference to FIGS. 21 to 23.

FIGS. 21 to 23 are flowcharts illustrating processing by the access point 102 according to this embodiment. It is noted that the processing is started when the wireless communications apparatus 101, which requests execution of wireless parameter automatic setting, participates in the wireless network constructed by the access point 102. It is noted that, at this moment, none of an encryption key, an authentication key, and so on is set in common for the wireless communications apparatus 101 and the access point 102. Hence, in the wireless network of the access point 102, the wireless communications apparatus 101 is in a state where communication with the access point 102 is possible only through a specific signal (a broadcast signal, an EAP packet, and so on). Thus, the wireless communications apparatus 101 cannot hold regular data communication in which encryption and authentication are utilized. Here, an EAP packet is used to transmit and receive various messages between the wireless communications apparatus 101 and the access point 102.

First, the access point 102 waits until the access point 102 receives the connection request message 611 from the wireless communications apparatus 101 (S301). If the access point 102 receives the connection request message 611 from the wireless communications apparatus 101 (S301: YES), the access point 102 transmits, to the server 103, the connection request message 612 including: the random number 663 and the ID 661 included in the connection request message 611; and the access point information 664 indicating the access point 102 (S302).

After the access point 102 transmits the connection request message 612, the access point 102 waits until receiving either the participation confirmation message 613 from the wireless communications apparatus 105 that has already established the connection to the access point 102, or a rejection notification message from the server 103 (S303 and S304).

If the access point 102 receives the rejection notification message (S304: YES), the access point 102 transmits a protocol failure message to the wireless communications apparatus 101 (S305), and finishes the processing. Here, the wireless communications apparatus 105 and the access point 102 have an encryption key, an authentication key, and so on set in common. Thus, the wireless communications apparatus 105 and the access point 102 can hold regular data communication, utilizing encryption and authentication.

If the access point 102 receives the participation confirmation message 613 from the wireless communications apparatus 105 (S303: YES), the access point 102 transmits, to the server 103, the participation confirmation message 614 including the access point information 665 indicating the access point 102 (S306). After the access point 102 transmits the participation confirmation message 614, the access point 102 waits until receiving either the authentication code request message 615A or a rejection notification message from the server 103 (S307 and S308). If the access point 102 receives the rejection notification message (S308: YES), the access point 102 respectively transmits a protocol failure message and the rejection notification message to the wireless communications apparatus 101 and the wireless communications apparatus 105 (S309), and finishes the processing.

If the access point 102 receives the authentication code request message 615A (S307: YES), the access point 102 transmits an authentication code request message 615B to the wireless communications apparatus 105 (S310). After the access point 102 transmits the authentication code request message 615B, the access point 102 waits until receiving, from the wireless communications apparatus 105, the authentication code information message 616A including the authentication code 666 (S311). Here, the authentication code 666 is a number or a character string unique to the wireless communications apparatus 101.

If the access point 102 receives the authentication code information message 616A (S311: YES), the access point 102 transmits, to the server 103, the authentication code information message 616B including the authentication code 666 included in the authentication code information message 616A (S312). After the access point 102 transmits the authentication code information message 616B, the access point 102 waits until receiving either the PIN code information message 617 or a rejection notification message from the server 103 (S313 and S314). If the access point 102 receives the rejection notification message (S314: YES), the access point 102 respectively transmits a protocol failure message and a rejection notification message to the wireless communications apparatus 101 and the wireless communications apparatus 105 (S315), and finishes the processing.

In contrast, if the access point 102 receives the PIN code information message 617 (S313: YES), the access point 102 sets the PIN code 667, included in the PIN code information message 617, for a wireless parameter automatic setting application (S316). Then, the access point 102 transmits the PIN code generation completion message 618 to the wireless communications apparatus 101 (S317). Next, using the set PIN code 667, the access point 102 executes a setting information notification protocol between the access point 102 and the wireless communications apparatus 101 (S318).

Then, the access point 102 determines whether or not the setting information notification protocol has succeeded (S319). Here, the success of the setting information notification protocol is a case where a PIN code held in the Registrar matches a PIN code held in the Enrollee, and a provision of a wireless parameter from the Registrar to the Enrollee has been completed. If the setting information notification protocol succeeds (S319: YES), the access point 102 transmits the WPS success message 623 to the server 103 (S320). After the access point 102 transmits a WPS success message, the access point 102 waits until receiving the connection permission message 624A from the server 103 (S321). If the access point 102 receives the connection permission message 624A (S321: YES), the access point 102 transmits the connection permission message 624B to the wireless communications apparatus 105 (S322), and finishes the processing.

In contrast, if the setting information notification protocol fails (S319: NO), the access point 102 transmits a WPS failure message to the server 103 (S323). After the access point 102 transmits the WPS failure message, the access point 102 waits until receiving a connection failure message from the server 103 (S324). If the access point 102 receives the connection failure message (S324: YES), the access point 102 transmits the connection failure message to the wireless communications apparatus 105 (S325), and finishes the processing.

Figure 24:
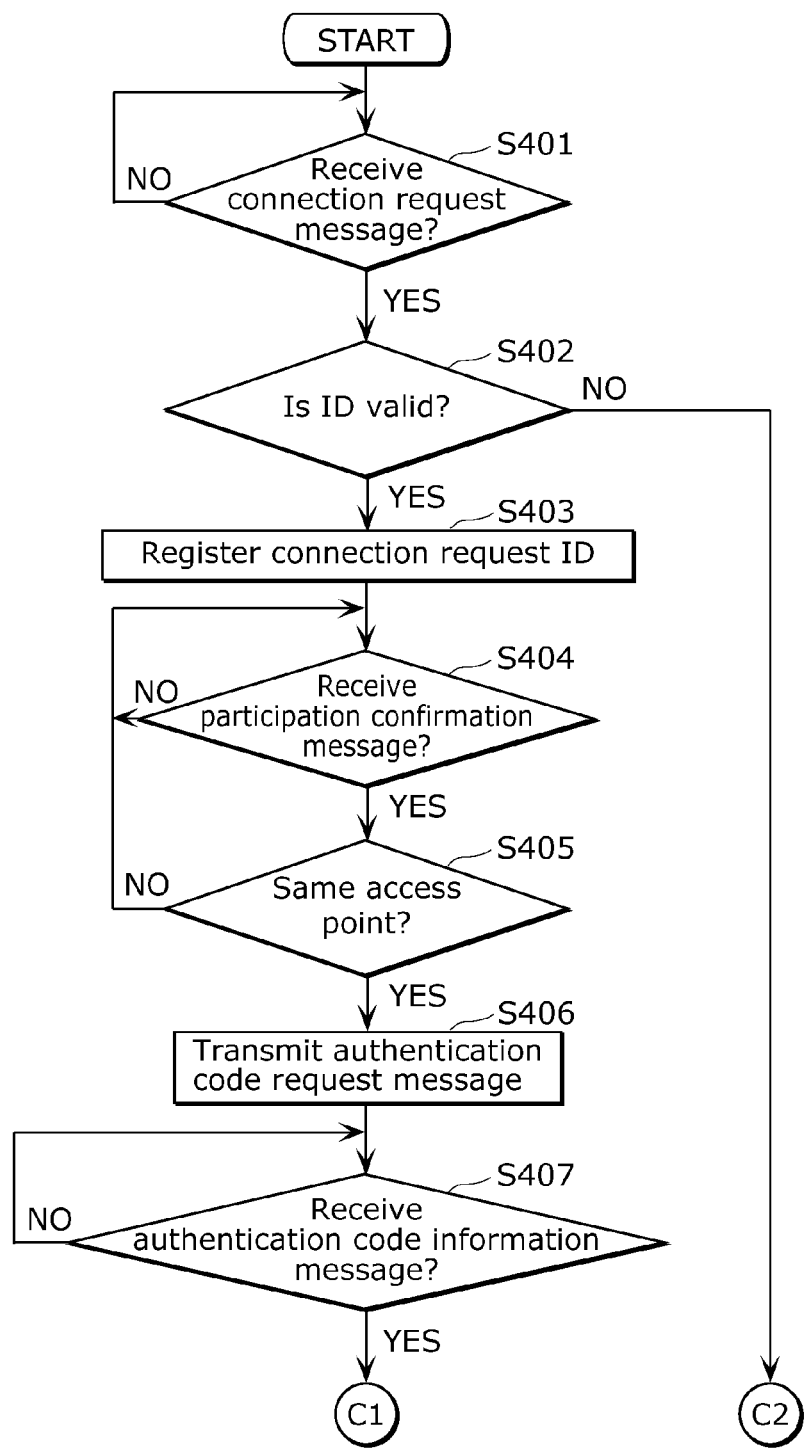
FIG. 24 is a flowchart illustrating processing by the server according to Embodiment 1.
Figure 25:
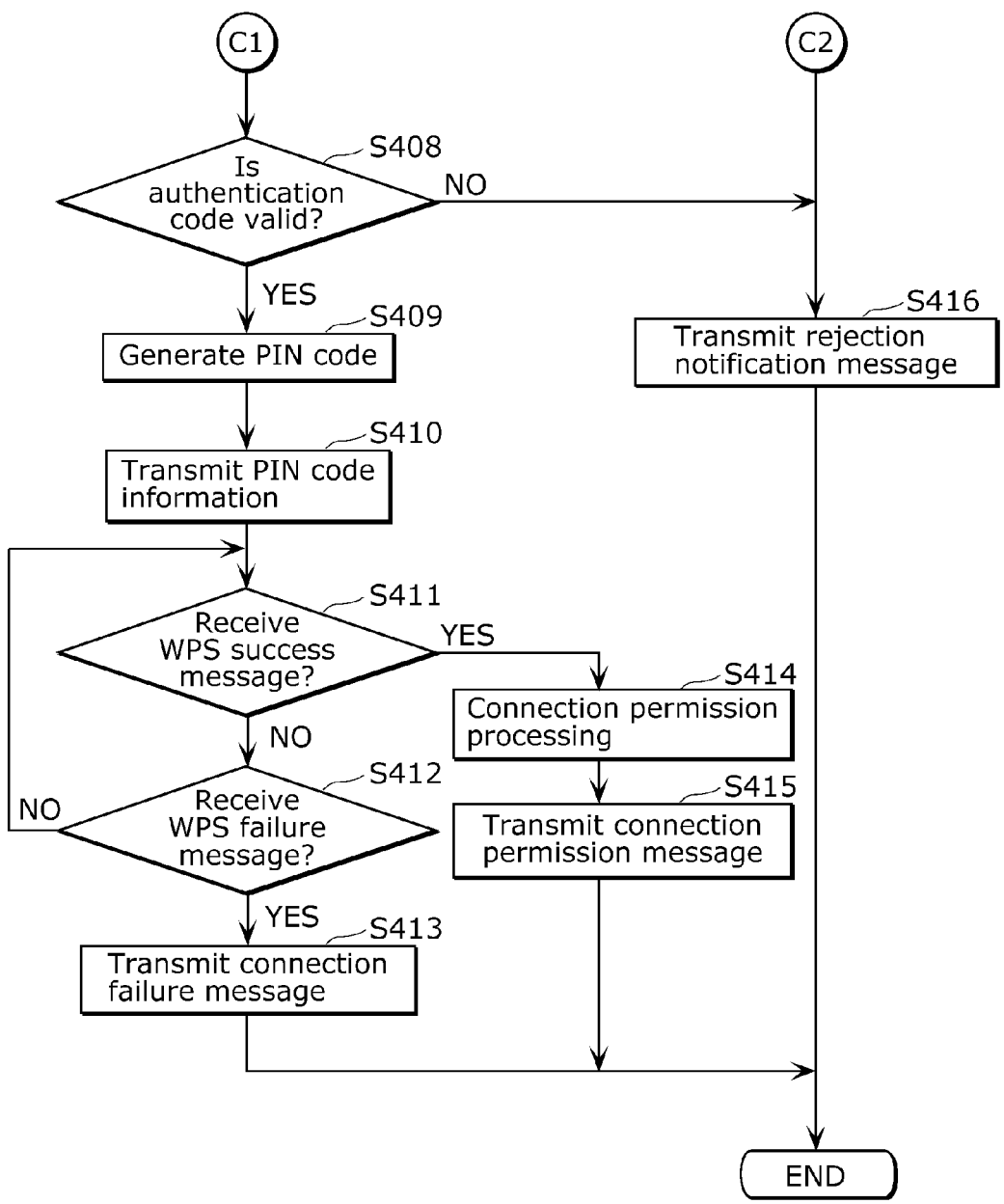
FIG. 25 is a flowchart illustrating processing by the server according to Embodiment 1.

Next, a processing sequence is described of how the server 103 executes authentication when the wireless communications apparatus 101 connects to the Internet 104, with reference to FIGS. 24 and 25. FIGS. 24 and 25 are flowcharts illustrating processing by the server 103 according to this embodiment.

First, the server 103 waits until receiving the connection request message 612 from the access point 102 (S401). If the server 103 receives the connection request message from the access point 102 (S401: YES), the server 103 checks whether or not the ID 661 included in the connection request message 612 is valid (S402). For example, with reference to account managing information held in the recording unit 408, the server 103 determines that the received ID 661 is valid if the received ID 661 matches an ID previously registered as a valid ID.

Here, if the received ID 661 is invalid (S402: NO), the server 103 transmits a rejection notification message to the access point 102 (S416), and finishes the processing. In contrast, if the received ID 661 is valid (S402: YES), the server 103 registers the ID 661 of the wireless communications apparatus 101 that has transmitted the connection request message 611 (S403).

Next, the server 103 waits until receiving the participation confirmation message 614 from the access point 102 (S404). If the server 103 receives the participation confirmation message 614 (S404: YES), the server 103 checks whether or not the access point, indicated in the access point information 665 included in the participation confirmation message 614, is the same as the access point indicated in the access point information 664 included in the connection request message 612 (S405).

Here, if the access points are different from each other (S405: NO), the server 103 waits until receiving the participation confirmation message 614 from the access point 102 (S404). In contrast, if the access points are the same—in other words, if the participation confirmation message 614 is transmitted from the access point 102—(S405: YES), the server 103 transmits the authentication code request message 615A to the access point 102 (S406).

Next, the server 103 waits until receiving the authentication code information message 616B from the access point 102 (S407). If the server 103 receives the authentication code information message 616B from the access point 102 (S407: YES), the server 103 checks whether or not the authentication code 666, included in the authentication code information message 616B, is connected to the ID for which the connection request has been made (S408). For example, with reference to account managing information held in the recording unit 408, the server 103 determines that the received authentication code 666 is valid if the received authentication code 666 matches an authentication code previously connected to the ID. Here, since the authentication code is unique to the wireless communications apparatus 101, this processing makes it possible to authenticate the validity of the wireless communications apparatus 105.

Here, if the received authentication code 666 is invalid (S408: NO), the server 103 transmits a rejection notification message to the access point 102 (S416), and finishes the processing. In contrast, if the received authentication code 666 is valid (S408: YES), the server 103 generates the PIN code 667, using the random number 663 included in the connection request message 612 and the authentication code 666 included in the authentication code information message 616B (S409).

Next, the server 103 transmits, to the access point 102, the PIN code information message 617 including the generated PIN code 667 (S410). After the server 103 transmits the PIN code information message 617, the server 103 waits until receiving either the WPS success message 623 or a WPS failure message from the access point 102 (S411 and S412).

If the server 103 receives the WPS success message 623 (S411: YES), the server 103 executes processing to allow the wireless communications apparatus 101 to connect to the Internet 104 (S414). Next, the server 103 transmits the connection permission message 624A to the access point 102 (S415), and finishes the processing. Moreover, if the server 103 receives the WPS failure message (S412: YES), the server 103 transmits a connection failure message to the access point 102 (S413), and finishes the processing.

Figure 26:
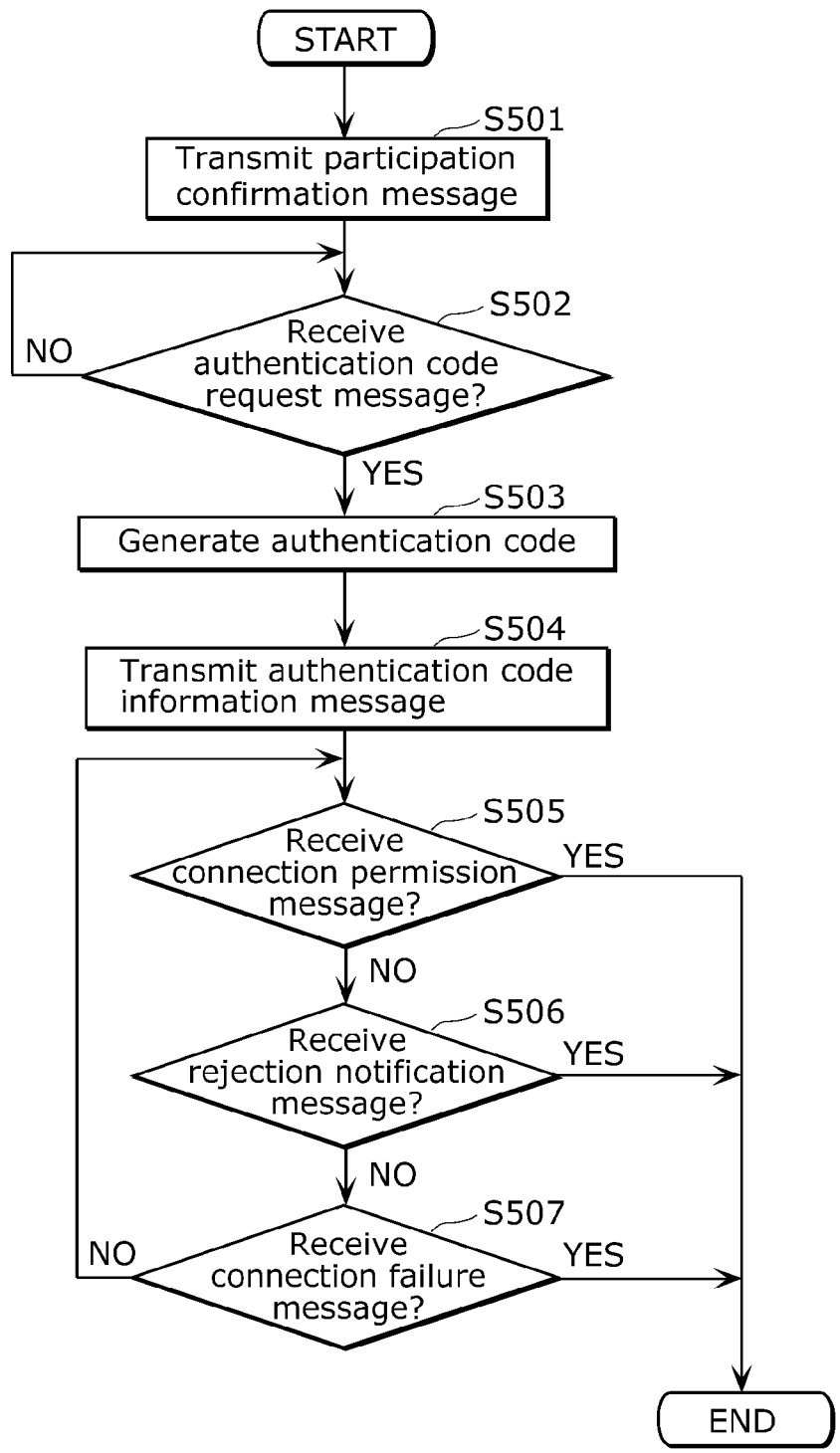
FIG. 26 is a flowchart illustrating processing by the wireless communications apparatus that has already established communication with the access point according to Embodiment 1.

Next, a processing sequence is described of how the wireless communications apparatus 105 executes an authentication procedure when the wireless communications apparatus 101 connects to the Internet 104, with reference to FIG. 26.

FIG. 26 is a flowchart illustrating processing by the wireless communications apparatus 105 according to this embodiment. Here, the wireless communications apparatus 105 and the access point 102 have an encryption key, an authentication key, and so on already set in common. Thus, in the wireless network of the access point 102, the wireless communications apparatus 105 can hold regular data communication, utilizing encryption and authentication.

First, the wireless communications apparatus 105 transmits the participation confirmation message 613 to the access point 102 (S501), and waits until receiving the authentication code request message 615B from the access point 102 (S502).

If the wireless communications apparatus 105 receives the authentication code request message 615B (S502: YES), the wireless communications apparatus 105 generates the authentication code 666 according to a user operation and so on (S503). Here, the authentication code 666 is a number or a character string which is unique to the wireless communications apparatus 101. Next, the wireless communications apparatus 105 transmits, to the access point 102, the authentication code information message 616A including the generated authentication code 666 (S504).

After the wireless communications apparatus 105 transmits the authentication code information message 616A, the wireless communications apparatus 105 waits until receiving, from the access point 102, one of the connection permission message 624B, a rejection notification message, and a connection failure message (S505, S506, and S507). If the wireless communications apparatus 105 receives, from the access point 102, one of the connection permission message 624B, the rejection notification message, and the connection failure message (S505: YES, S506: YES, or S507: YES), the wireless communications apparatus 105 finishes the processing.

Embodiment 2

Next, Embodiment 2 will be described in detail with reference to the drawings. In Embodiment 1, the user operates the wireless communications apparatus 101, and then the wireless communications apparatus 105 that has already established communication with the access point 102. In this embodiment, the user operates the wireless communications apparatus 105, and then the wireless communications apparatus 101.

It is noted that the outline of the configuration of the communications system 100, as well as the outlines of the configurations of the wireless communications apparatus 101, the access point 102, the server 103, and the wireless communications apparatus 105 that has already established communication with the access point 102, is the same as the outline described in Embodiment 1 with reference to FIGS. 1 to 5, and the description thereof will be omitted.

Hereinafter, an account authentication sequence executed among the wireless communications apparatus 101, the access point 102, the server 103, and the wireless communications apparatus 105 is described with reference to FIGS. 27 and 28.

Figure 27:
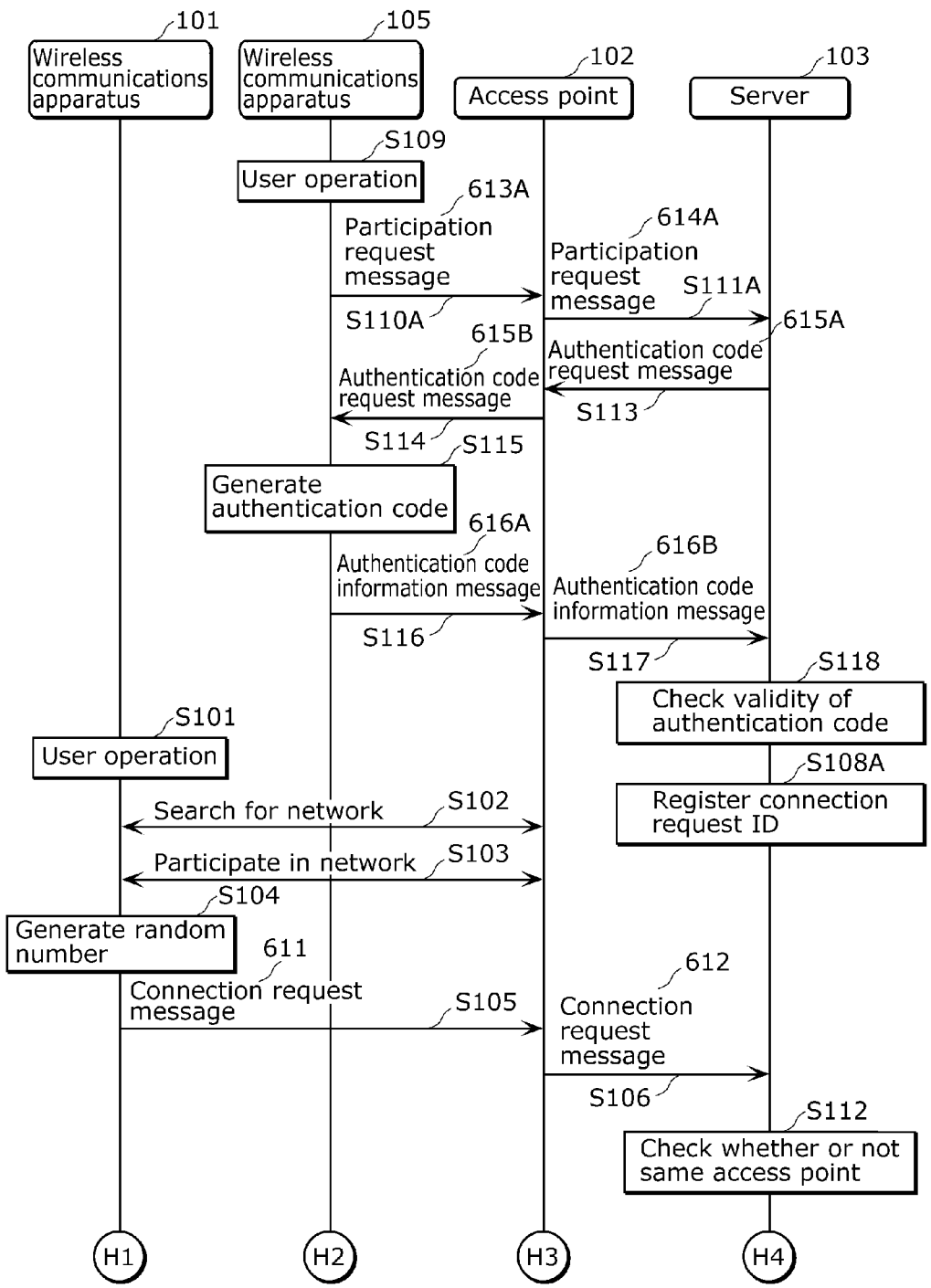
FIG. 27 is a sequence diagram of account authentication processing according to Embodiment 2.
Figure 28:
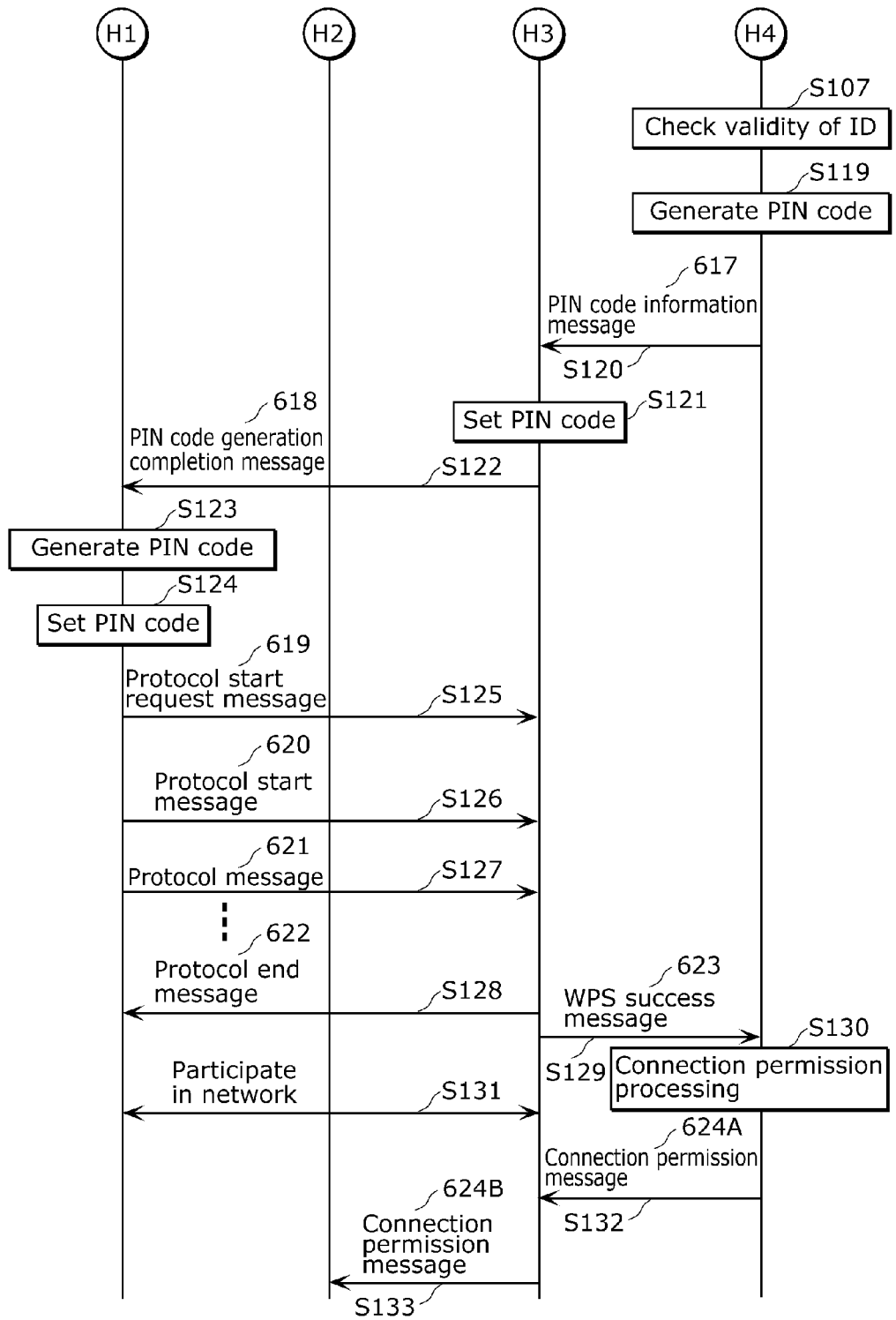
FIG. 28 is a sequence diagram of account authentication processing according to Embodiment 2.

FIGS. 27 and 28 are sequence diagrams illustrating an account authentication sequence according to this embodiment. It is noted that, in the drawings below, processing similar to the processing that has already described has the same numerical sign as that of the already-described processing, and an overlapping description thereof may be omitted.

First, on the wireless communications apparatus 105 that has already established a connection to the access point 102, a participation registration application is started by a user operation and so on (S109). Next, the wireless communications apparatus 105 transmits a participation request message 613A to the access point 102 (S110A). When the access point 102 receives the participation request message 613A, the access point 102 adds the access point information 665 to the participation request message 613A to generate a participation request message 614A, and transmits the generated participation request message 614A to the server 103 (S111A). It is noted that the participation request message 614A is similar in configuration to the participation confirmation message 614 illustrated in FIG. 15, for example. Next, the server 103 transmits the authentication code request message 615A to the access point 102 (S113). It is noted that the processing in steps S113 to S117 is the same as the processing described in FIG. 6, and the description thereof will be omitted.

When the server 103 receives the authentication code information message 616B from the access point 102, the server 103 checks the validity of the authentication code 666 included in the received authentication code information message 616B (S118). If the authentication code 666 is valid, the server 103 registers the wireless communications apparatus 101 whose ID is connected to the received authentication code 666 as a terminal which has a connection request to the access point 102 (S108A). Next, on the wireless communications apparatus 101, a wireless parameter automatic setting application is started by a user operation and so on (S101). It is noted that the processing in steps S101 to S106 is the same as the processing described in FIG. 6, and the description thereof will be omitted.

When the server 103 receives the connection request message 612 from the access point 102, the server 103 checks whether or not there is a terminal which has the connection request to the access point 102. Specifically, the server 103 checks whether or not an access point indicated in the access point information 665 included in the participation confirmation message 614 is the same as an access point indicated in the access point information 664 included in the connection request message 612 (S112). If there is such a terminal (if the access point information 665 and the access point information 666 indicate the same access point), the server 103 checks the validity of the ID 661 included in the received connection request message 612 (S107). If the ID 661 is valid, the server 103 generates a PIN code for setting a wireless parameter of the wireless communications apparatus 101, which is a terminal having the connection request to the access point 102, using the random number 663 included in the connection request message 612 and the authentication code 666 included in the authentication code information message 616B (S119). It is noted that the processing described hereinafter (S120 to S133) is the same as the processing described in FIG. 7, and the description thereof will be omitted.

In addition to the effects of Embodiment 1, this embodiment allows the wireless communications apparatus 105 to previously register a wireless communications apparatus which newly participates in the wireless network. Thus, the wireless communications apparatus 101 can immediately set a wireless parameter when the wireless communications apparatus 101 makes a wireless network participation request.

Next, a processing flow for each of the units is described. It is noted that a processing sequence of the wireless communications apparatus 101 executing a setting information notification protocol in this embodiment is the same as that in Embodiment 1 with reference to FIG. 20, and the description thereof will be omitted.

Figure 29:
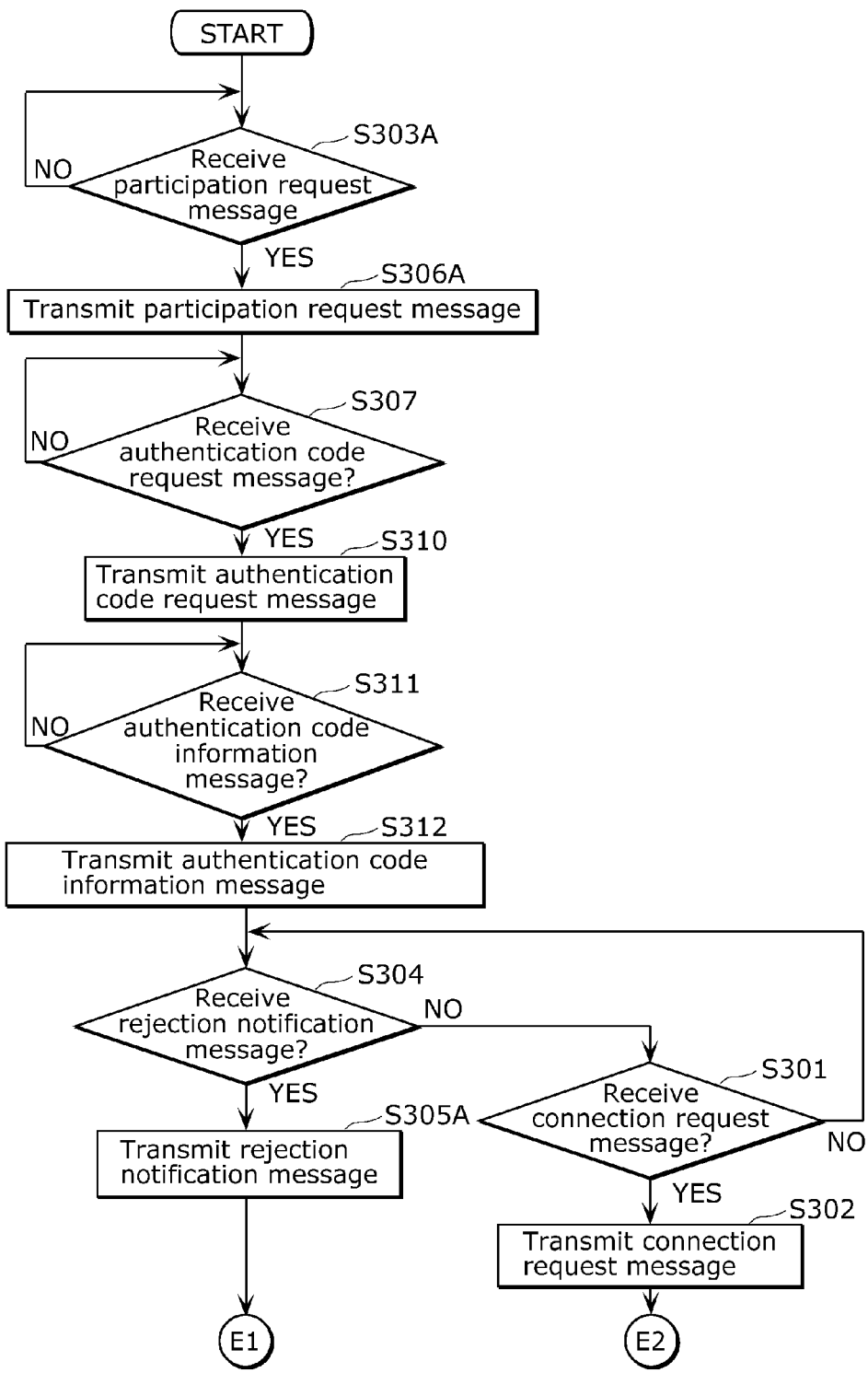
FIG. 29 is a flowchart illustrating processing by an access point according to Embodiment 2.
Figure 30:
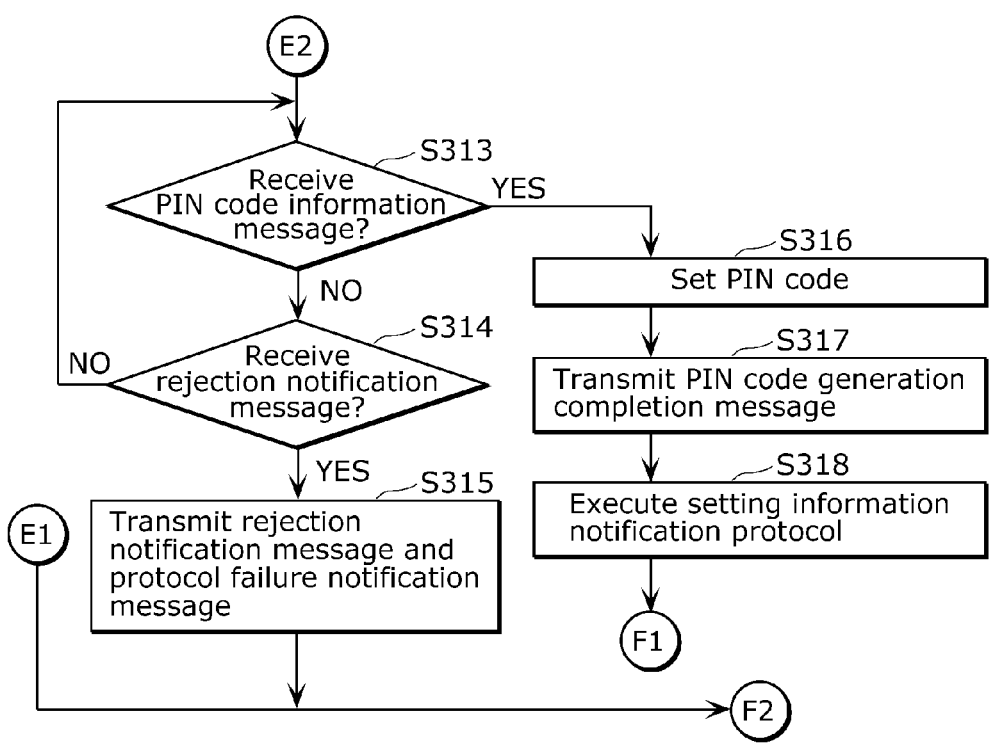
FIG. 30 is a flowchart illustrating processing by the access point according to Embodiment 2.
Figure 31:
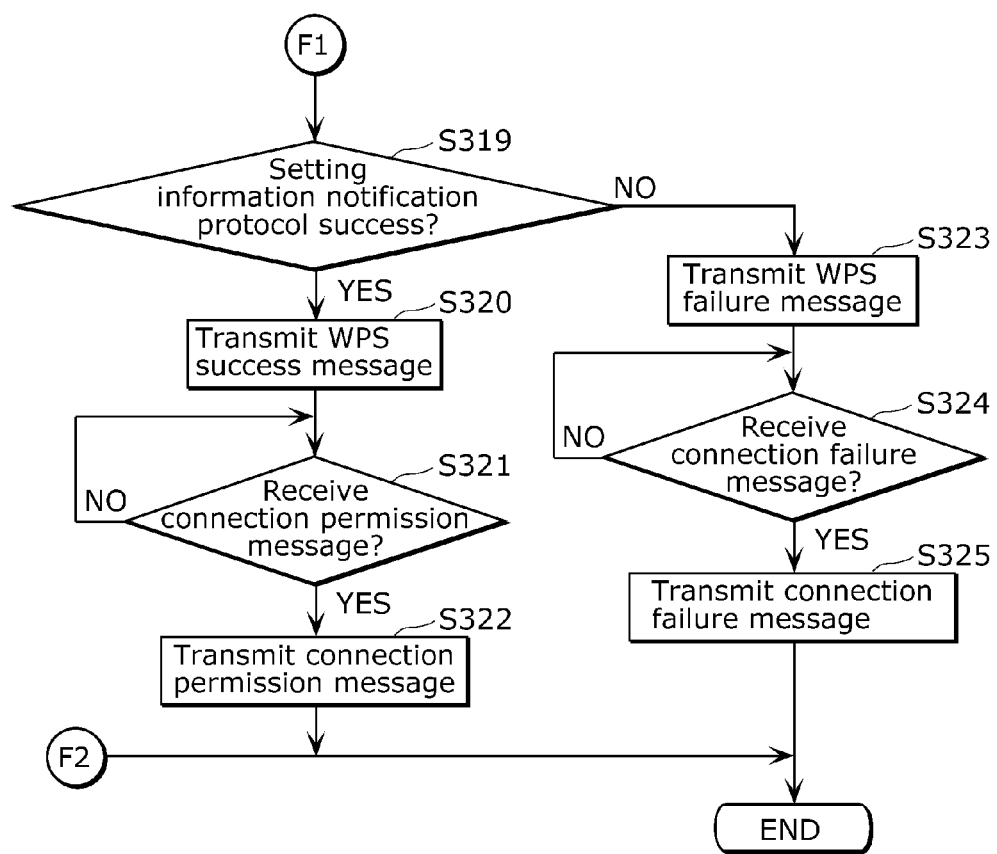
FIG. 31 is a flowchart illustrating processing by the access point according to Embodiment 2.

Next, a processing sequence is described of how the access point 102 executes a setting information notification protocol, with reference to FIGS. 29 to 31. FIGS. 29 to 31 are flowcharts illustrating processing by the access point 102 according to this embodiment.

First, the access point 102 waits until receiving the participation request message 613A from the wireless communications apparatus 105 (S303A). If the access point 102 receives the participation request message 613A (S303: YES), the access point 102 transmits, to the server 103, the participation request message 614A including the access point information 665 indicating the access point 102 (S306A).

After the access point 102 transmits the participation request message 614A, the access point 102 waits until receiving the authentication code request message 615A from the server 103 (S307). If the access point 102 receives the authentication code request message 615A (S307: YES), the access point 102 transmits the authentication code request message 615B to the wireless communications apparatus 105 (S310). It is noted that the processing in steps S310 to S312 is the same as the processing described in FIG. 22, and the description thereof will be omitted.

After the access point 102 transmits the authentication code information message 616B, the access point 102 waits until receiving either a rejection notification message from the server 103 or the connection request message 611 from the wireless communications apparatus 101 (S304 and S301). If the access point 102 receives the rejection notification message (S304: YES), the access point 102 transmits the rejection notification message to the wireless communications apparatus 105 (S305A), and finishes the processing.

In contrast, if the access point 102 receives the connection request message 611 from the wireless communications apparatus 101 (S301: YES), the access point 102 transmits, to the server 103, the connection request message 612 including: the random number 663 and the ID 661 included in the connection request message 611; and the access point information 664 indicating the access point 102 (S302). It is noted that the processing described hereinafter (S313 to S325) is the same as the processing described in FIGS. 22 and 23, and the description thereof will be omitted.

Figure 32:
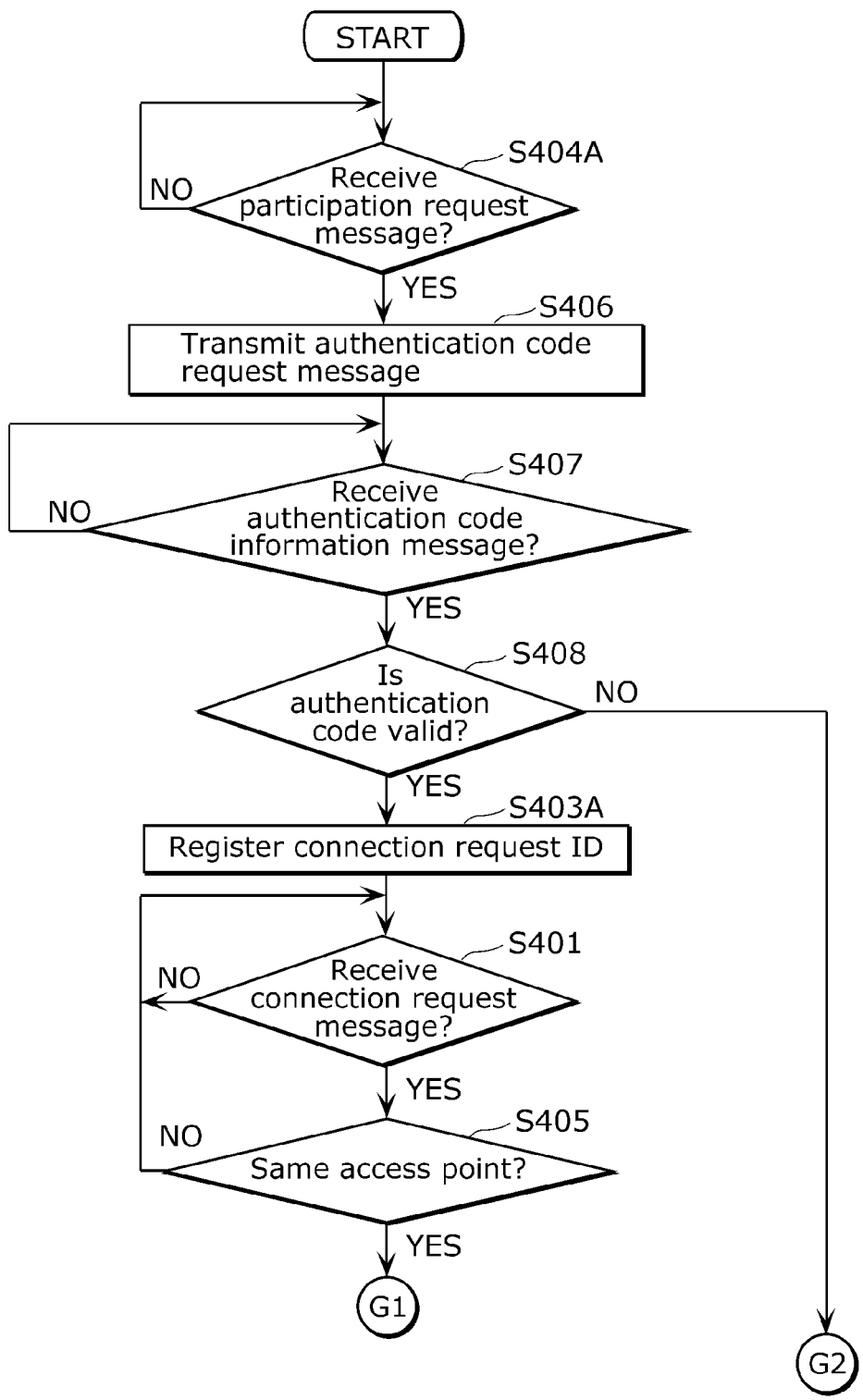
FIG. 32 is a flowchart illustrating processing by a server according to Embodiment 2.
Figure 33:
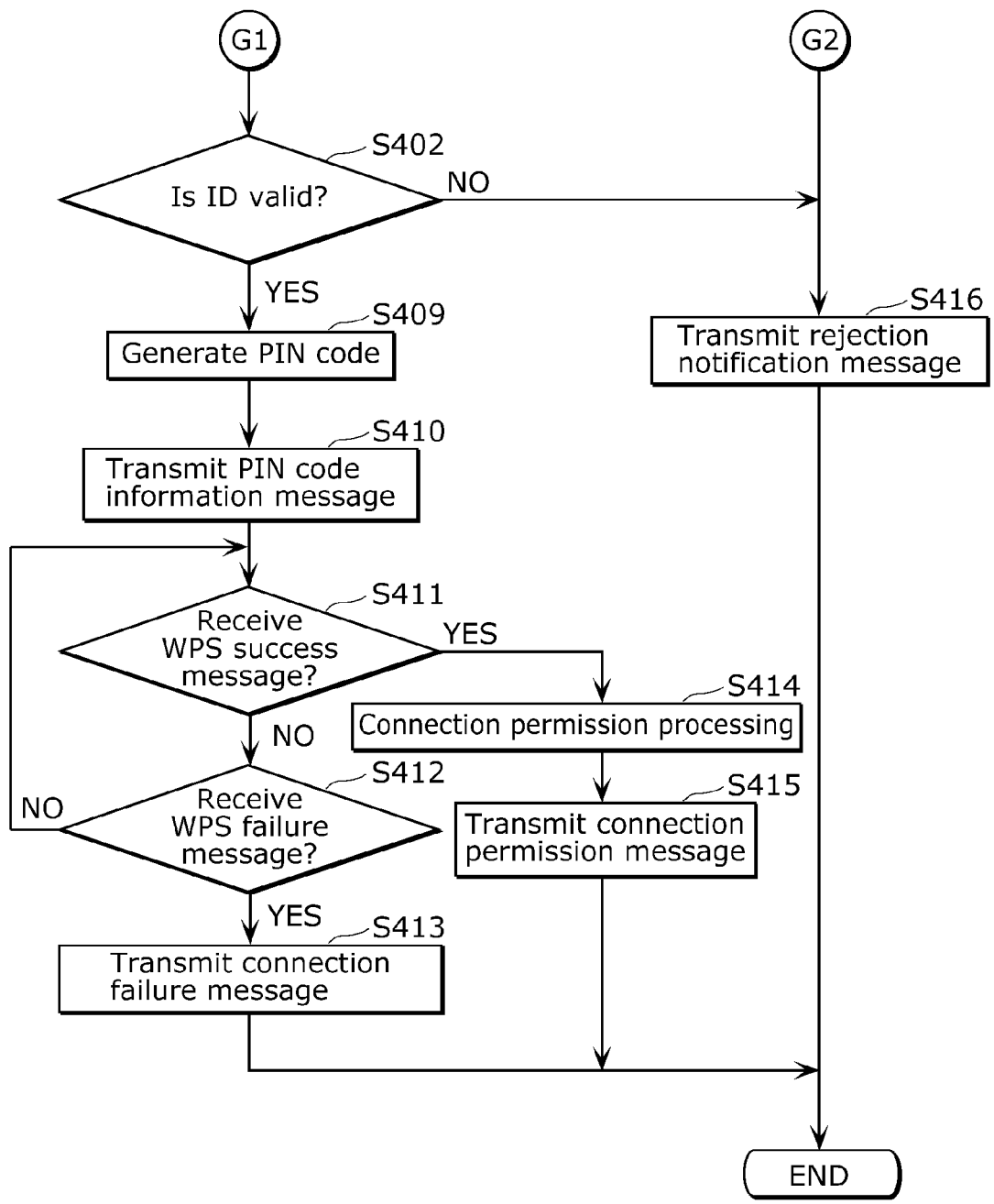
FIG. 33 is a flowchart illustrating processing by the server according to Embodiment 2.

Next, a processing sequence is described of how the server 103 executes authentication when the wireless communications apparatus 101 connects to the Internet 104, with reference to FIGS. 32 and 33. FIGS. 32 and 33 are flowcharts illustrating processing by the server 103 according to this embodiment.

First, the server 103 waits until receiving the participation request message 614A from the access point 102 (S404A). If the server 103 receives the participation request message 614A from the access point 102 (S404A: YES), the server 103 transmits the authentication code request message 615A to the access point 102 (S406). It is noted that the processing in steps S406 and S407 is the same as the processing described in FIG. 24, and the description thereof will be omitted.

If the server 103 receives the authentication code information message 616B (S407: YES), the server 103 checks whether or not the authentication code 666 added to the authentication code information message 616B is a valid authentication code (S408). For example, with reference to account managing information held in the recording unit 408, the server 103 determines that the received authentication code 666 is valid if the received authentication code 666 matches an authentication code connected to an ID previously registered as a valid ID.

Here, if the received authentication code 666 is invalid (S408: NO), the server 103 transmits a rejection notification message to the access point 102 (S416), and finishes the processing. In contrast, if the received authentication code 666 is valid (S408: YES), the server 103 registers the ID of the wireless communications apparatus, the ID being connected to the authentication code 666 (S403A).

After the server 103 registers the ID of the wireless communications apparatus, the server 103 waits until receiving the connection request message 612 from the access point 102 (S401). If the server 103 receives the connection request message 612 (S401: YES), the server 103 checks whether or not the access point, indicated in the access point information 664 included in the participation confirmation message 612, is the same as the access point indicated in the access point information 665 included in the participation request message 614A (S405).

Here, if the access points are different from each other (S405: NO), the server 103 waits until receiving the connection request message 612 from the access point 102 (S401). If the access points are the same—in other words, if the connection request message 612 is transmitted from the access point 102—(S405: YES), the server 103 checks whether or not the ID 661 included in the connection request message 612 is a valid ID (S402). For example, with reference to account managing information held in the recording unit 408, the server 103 determines that the received ID 661 is valid if the ID 661 matches an ID which is previously registered as a valid ID.

Here, if the received ID 661 is invalid (S402: NO), the server 103 transmits a rejection notification message to the access point 102 (S416), and finishes the processing. In contrast, if the received ID 661 is valid (S402: YES), the server 103 generates the PIN code 667, using the random number 663 included in the connection request message 612 and the authentication code 666 included in the authentication code information message 616B (S409). It is noted that the processing described hereinafter (S410 to S415) is the same as the processing described in FIG. 25, and the description thereof will be omitted.

Figure 34:
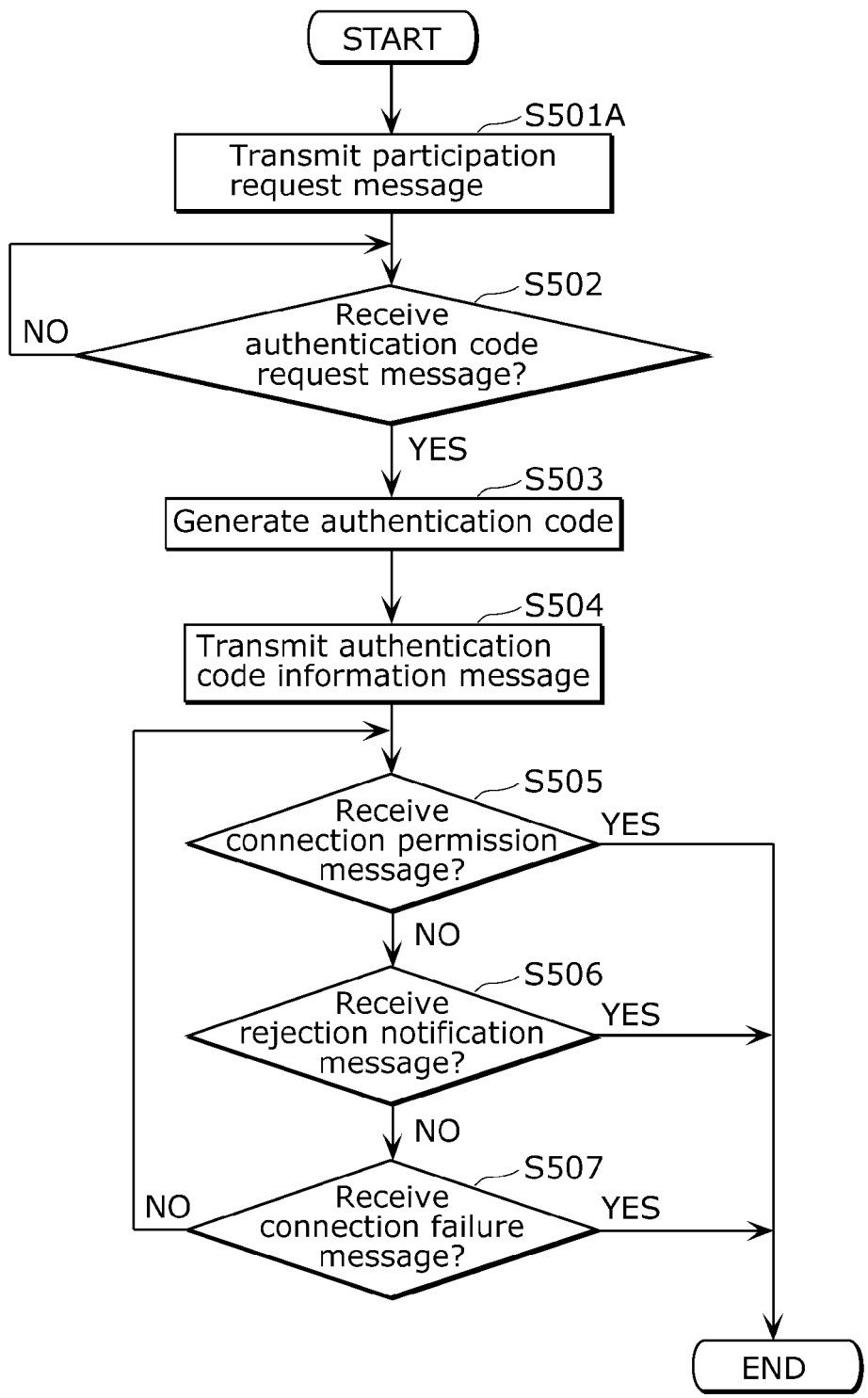
FIG. 34 is a flowchart illustrating processing by a wireless communications apparatus which has already established communication with the access point according to Embodiment 2.

Next, with reference to FIG. 34, a processing sequence is described of how the wireless communications apparatus 105 executes an authentication procedure when the wireless communications apparatus 101 connects to the Internet 104. FIG. 34 is a flowchart illustrating processing by the wireless communications apparatus 105 according to this embodiment.

First, the wireless communications apparatus 105 transmits the participation request message 613A to the access point 102 (S501A). It is noted that the processing described hereinafter (S502 to S507) is the same as the processing described in FIG. 26, and the description thereof will be omitted.

Embodiment 3

Next, Embodiment 3 will be described in detail with reference to the drawings. In this embodiment, a modification of Embodiment 1 will be described. In this embodiment, the wireless communications apparatus 101 transmits a wireless signal after transmitting the connection request message 611. Then, when the wireless communications apparatus 105 receives the wireless signal to be transmitted from the wireless communications apparatus 101, the wireless communications apparatus 105 transmits the participation confirmation message 613. This contributes to preventing the participation confirmation message 613 from being inadvertently transmitted.

It is noted that the outline of the configurations of the communications system 100, as well as the outline of the configurations of the access point 102, the server 103, and the wireless communications apparatus 105 that has already established communication with the access point 102, are the same as the outline described in Embodiment 1 with reference to FIGS. 1 and 3 to 5, and the description thereof will be omitted.

Figure 35:
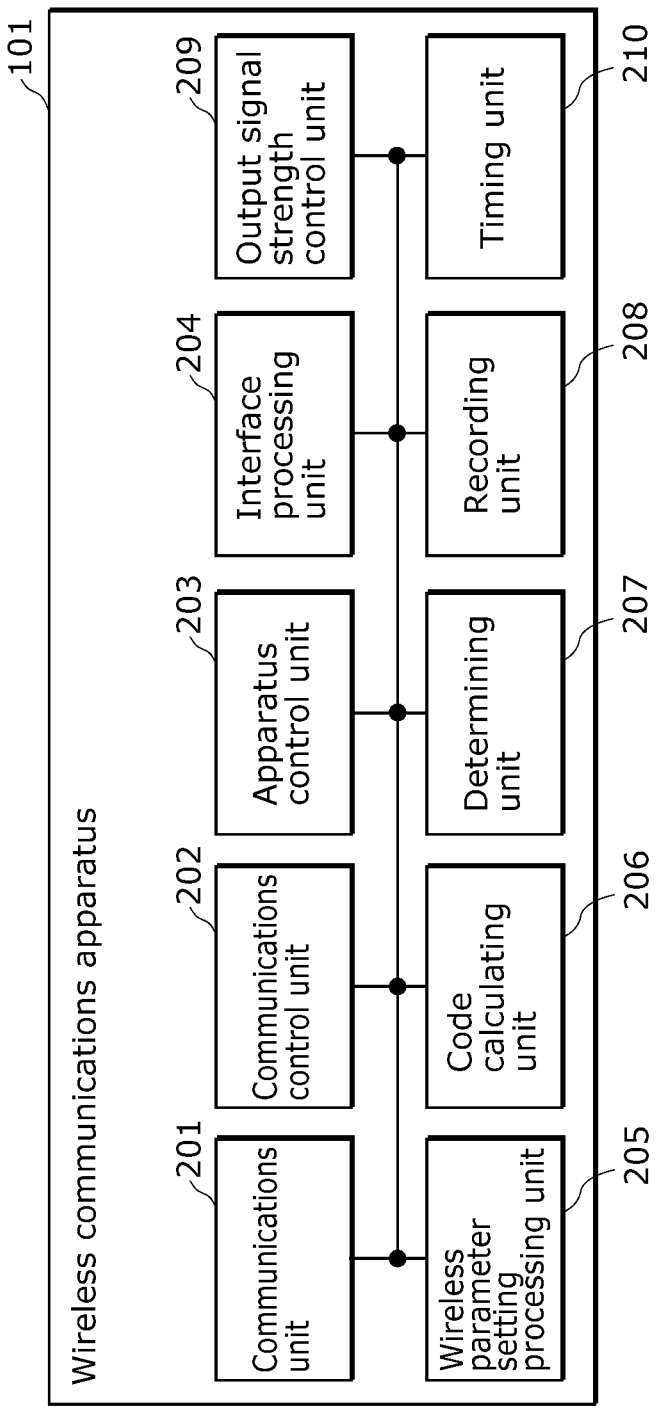
FIG. 35 is a block diagram illustrating a configuration example of a wireless communications apparatus according to Embodiment 3.

FIG. 35 is a block diagram illustrating a configuration example of the wireless communications apparatus 101 according to this embodiment. In addition to the configuration illustrated in FIG. 2, the wireless communications apparatus 101 illustrated in FIG. 35 includes an output signal strength control unit 209, and a timing unit 210. The output signal strength control unit 209 controls output strength of a wireless signal. The timing unit 210 manages timer processing and times.

Next, an account authentication sequence executed among the wireless communications apparatus 101, the access point 102, the server 103, and the wireless communications apparatus 105 is described with reference to FIGS. 36 and 37.

Figure 36:
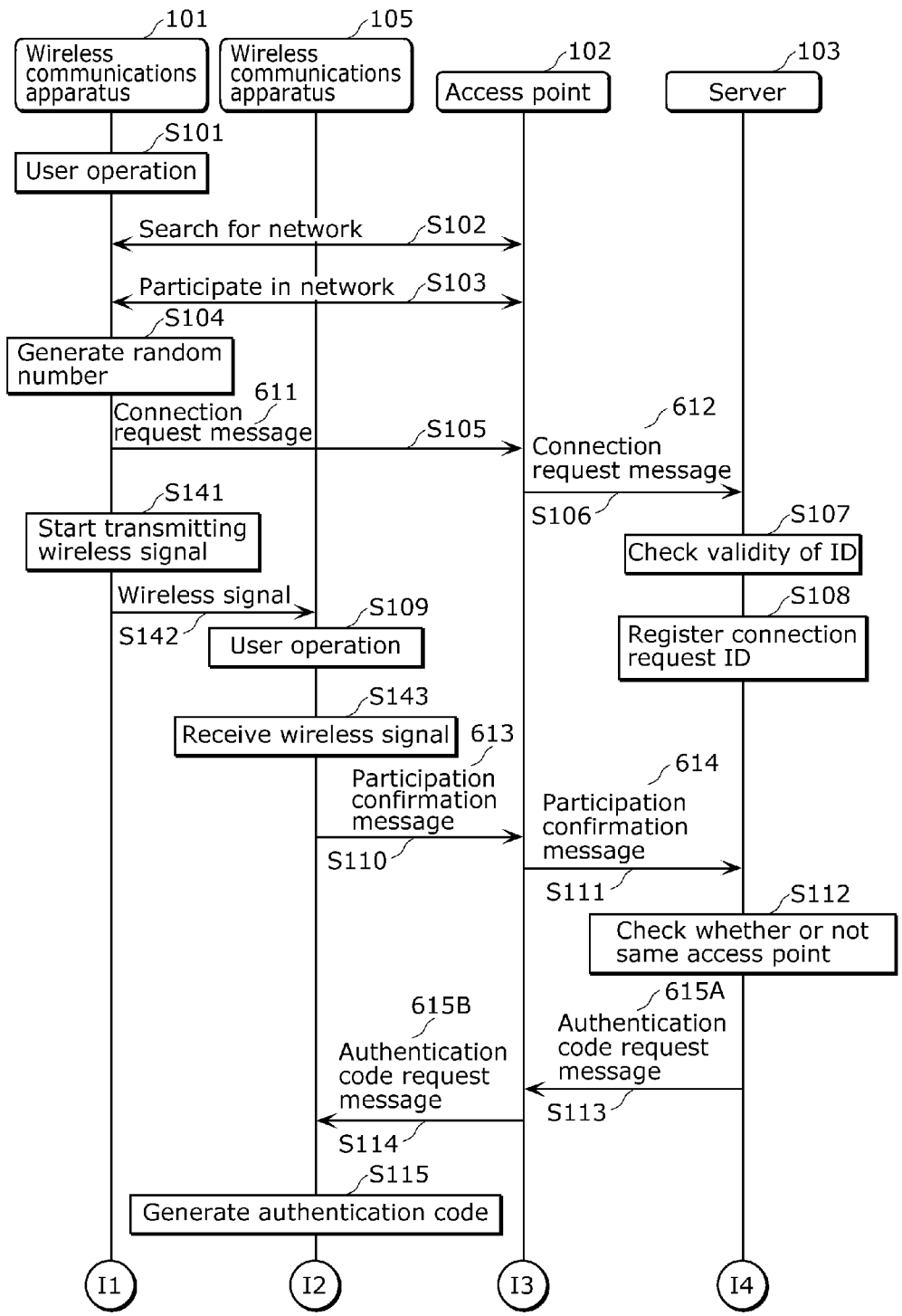
FIG. 36 is a sequence diagram of account authentication processing according to Embodiment 3.
Figure 37:
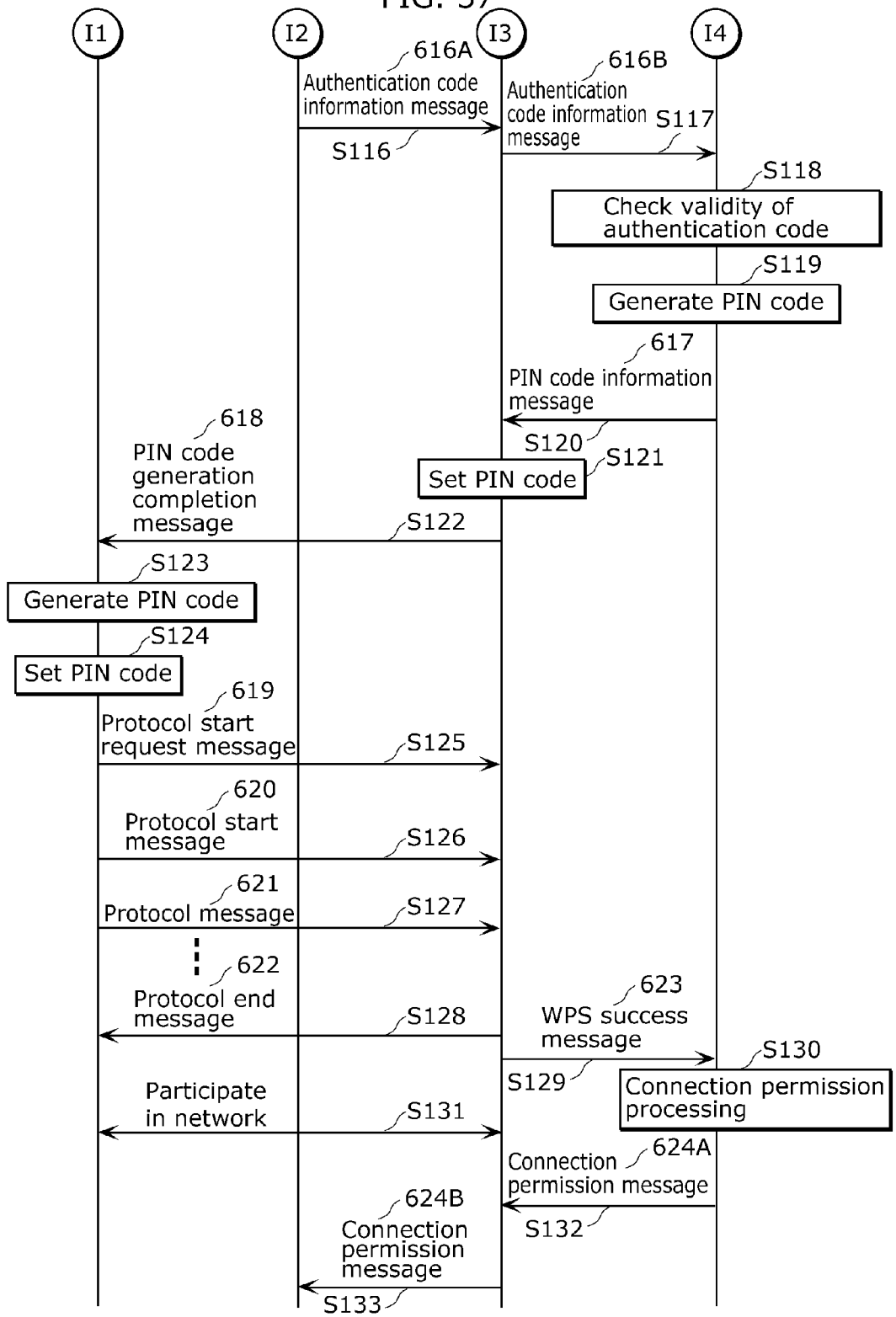
FIG. 37 is a sequence diagram of account authentication processing according to Embodiment 3.

FIGS. 36 and 37 are sequence diagrams illustrating an account authentication sequence according to this embodiment. It is noted that the processing in steps S101 to S108 is the same as the processing described in FIG. 6, and the description thereof will be omitted.

After the wireless communications apparatus 101 transmits the connection request message 611 to the access point 102, the wireless communications apparatus 101 starts transmitting a wireless signal (beacon) (S141). The wireless communications apparatus 101 gradually increases the strength of the transmitted wireless signal until the wireless communications apparatus 101 receives the PIN code generation completion message 618.

Moreover, on the wireless communications apparatus 105 that has already established a connection to the access point 102, a participation registration application is started by a user operation and so on. After that, the wireless communications apparatus 105 waits until receiving the wireless signal from the wireless communications apparatus 101 (S143). Next, when the wireless communications apparatus 105 receives the wireless signal, the wireless communications apparatus 105 transmits a participation confirmation message 613 to the access point 102 (S110). It is noted that the processing described hereinafter (S111 to S133) is the same as the processing described in FIGS. 6 and 7, and the description thereof will be omitted.

As described above, in this embodiment, the wireless communications apparatus 101 transmits the wireless signal, after transmitting the connection request message 611 to the first wireless access point (for example, the access point 102 or the access point 102A) (S142). When the wireless communications apparatus 105 receives the above wireless signal (S143), the wireless communications apparatus 105 transmits the participation confirmation message 613 to the second wireless access point (the access point 102) (S110).

Hence, the wireless communications apparatus 105, which has already established a connection to the access point 102, does not transmit a participation confirmation message until receiving a wireless signal to be transmitted from the wireless communications apparatus 101 that newly participates in the wireless network. Hence, in addition to the effects in Embodiment 1, Embodiment 3 makes it possible to prevent the participation confirmation message 613 from being inadvertently transmitted from a user away from the wireless communications apparatus 101 that requires new registration.

Figure 38:
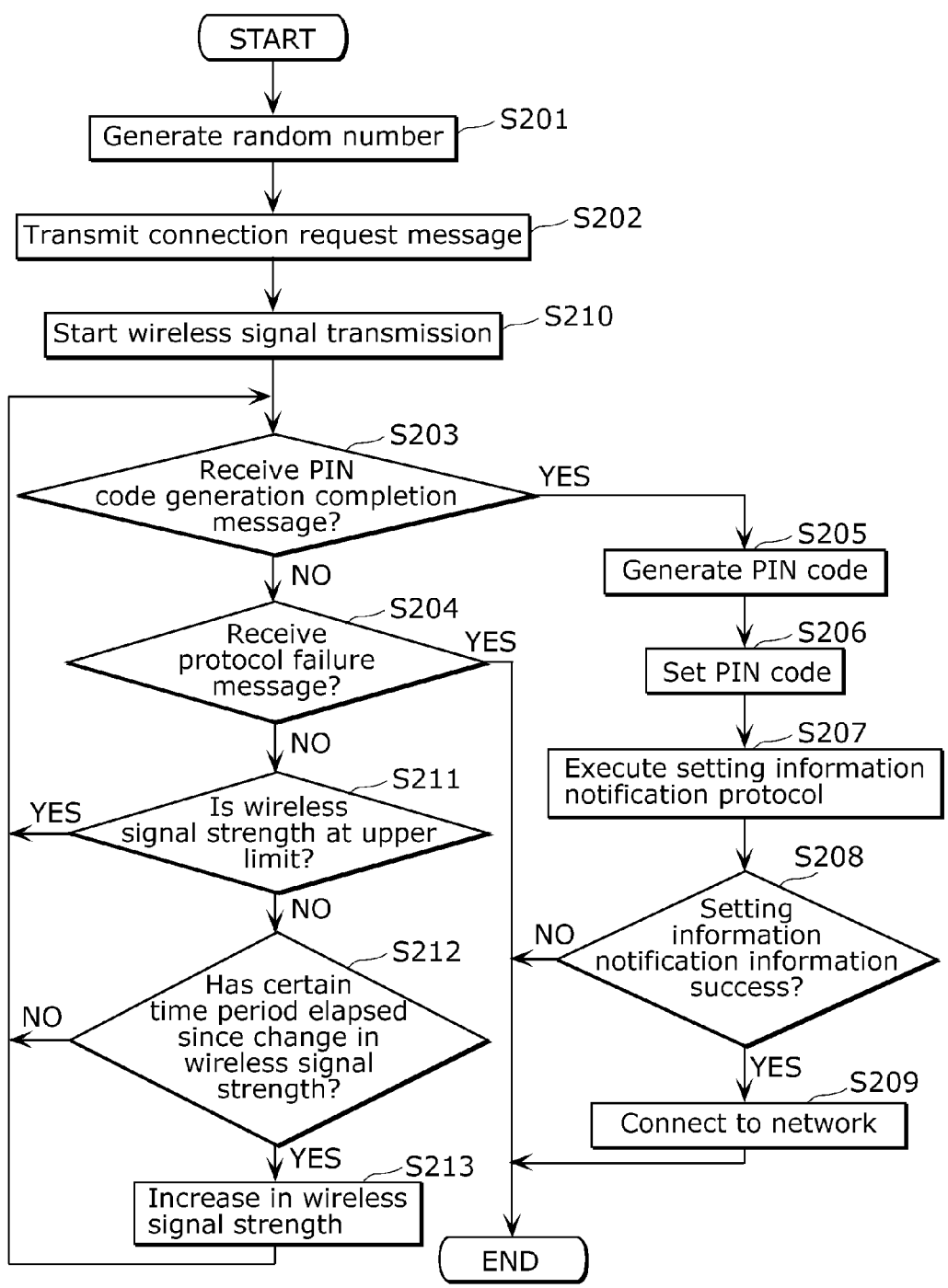
FIG. 38 is a flowchart illustrating processing by the wireless communications apparatus according to Embodiment 3.

Next, a processing flow of each of the units is described. First, a processing sequence is described of how the wireless communications apparatus 101 executes a setting information notification protocol in this embodiment, with reference to FIG. 38.

It is noted that the processing in steps S201 and S202 is the same as the processing described in FIG. 20, and the description thereof will be omitted. The wireless communications apparatus 101 starts transmitting a wireless signal (beacon), after transmitting the connection request message 611 (S210).

After the wireless communications apparatus 101 transmits the wireless signal, the wireless communications apparatus 101 determines whether or not the wireless communications apparatus 101 receives the PIN code generation completion message 618 from the access point 102 (S203). If the wireless communications apparatus 101 does not receive the PIN code generation completion message 618 (S203: NO), the wireless communications apparatus 101 determines whether or not the wireless communications apparatus 101 receives a protocol failure message (S204). If the wireless communications apparatus 101 receives the protocol failure message (S204: YES), the wireless communications apparatus 101 finishes the processing.

If the wireless communications apparatus 101 does not receive the protocol failure message (S204: NO), the wireless communications apparatus 101 determines whether or not the transmitted output strength of the current wireless signal is at the upper limit (S211). If the transmitted output strength is at the upper limit (S211: YES), the wireless communications apparatus 101 goes back to the step S203. If the transmitted output strength is not at the upper limit (S211: NO), the wireless communications apparatus 101 determines whether or not a certain time period has elapsed since a change of the wireless signal in transmitted output strength (S212). If the certain time period has not elapsed (S212: NO), the wireless communications apparatus 101 goes back to the step S203. If the certain time period has elapsed (S212: YES), the wireless communications apparatus 101 increases the transmitted output strength of the wireless signal (S213), and goes back to the step S203.

In contrast, if the wireless communications apparatus 101 receives the PIN code generation completion message 618 from the access point 102 (S203: YES), the wireless communications apparatus 101 generates a PIN code using the authentication code 662 and the random number 663 (S205). It is noted that the processing in steps S206 to S209 is the same as the processing described in FIG. 20, and the description thereof will be omitted.

It is noted that the processing sequence when the access point 102 according to this embodiment executes the setting information notification protocol is the same as that of Embodiment 1 described in FIGS. 21 to 23, and the description thereof will be omitted.

In addition, the processing sequence of authentication executed by the server 103 when the wireless communications apparatus 101 according to this embodiment connects to the Internet 104 is the same as that of Embodiment 1 described in FIGS. 24 and 25, and the descriptions thereof will be omitted.

Figure 39:
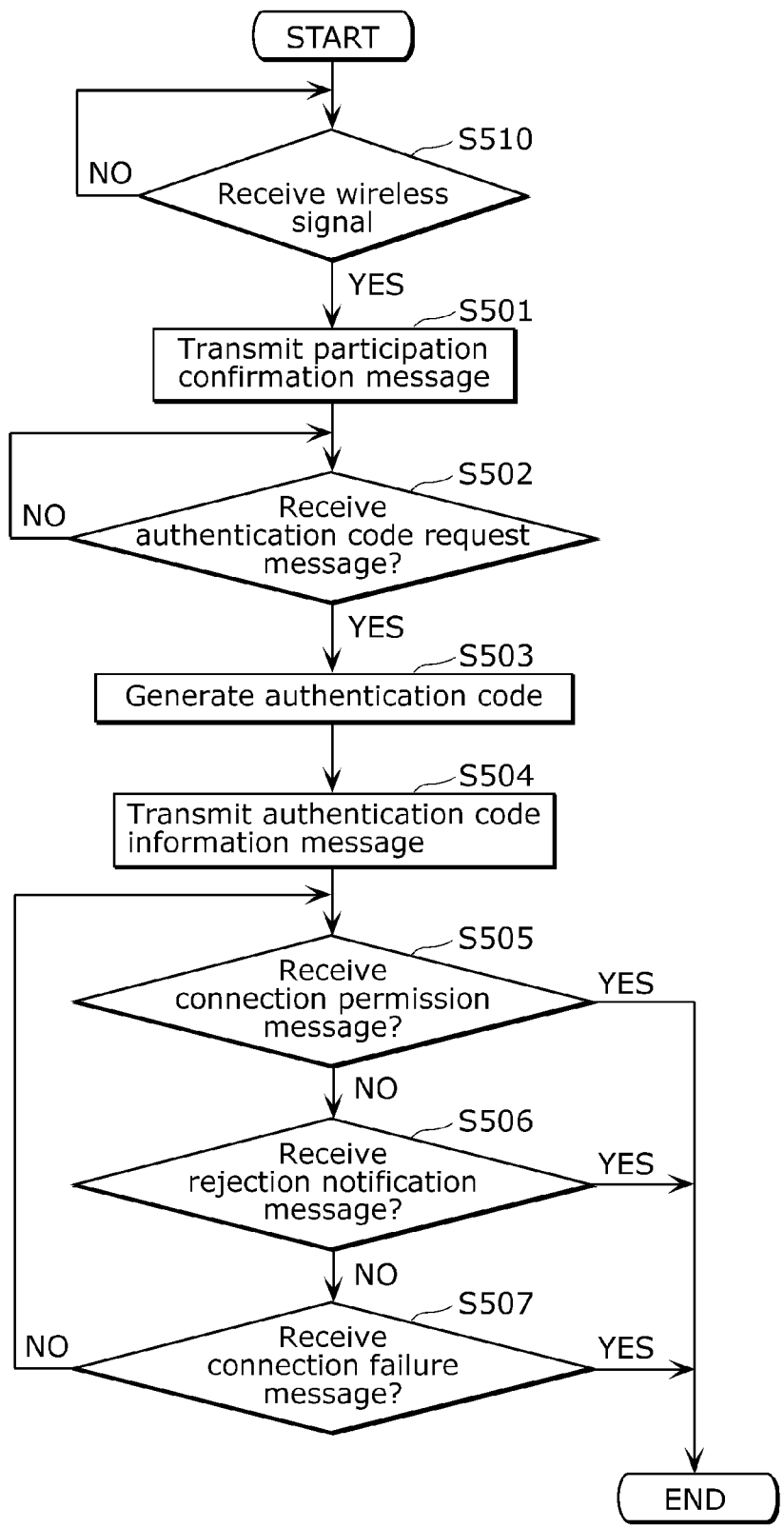
FIG. 39 is a flowchart illustrating processing by a wireless communications apparatus which has already established communication with the access point according to Embodiment 3.

Next, with reference to FIG. 39, a processing sequence is described of how the wireless communications apparatus 105 executes an authentication procedure when the wireless communications apparatus 101 connects to the Internet 104.

FIG. 39 is a flowchart illustrating processing by the wireless communications apparatus 105 according to this embodiment. It is noted that the wireless communications apparatus 105 and the access point 102 have an encryption key, an authentication key, and so on already set in common. Thus, in the wireless network of the access point 102, the wireless communications apparatus 105 can hold regular data communication, utilizing encryption and authentication.

First, the wireless communications apparatus 105 waits until receiving a wireless signal from the wireless communications apparatus 101 (S510). If the wireless communications apparatus 105 receives the wireless signal from the wireless communications apparatus 101 (S510: YES), the wireless communications apparatus 105 transmits the participation confirmation message 613 to the access point 102 (S501). It is noted that the processing described hereinafter (S502 to S507) is the same as the processing described in FIG. 26, and the description thereof will be omitted.

Figure 40:
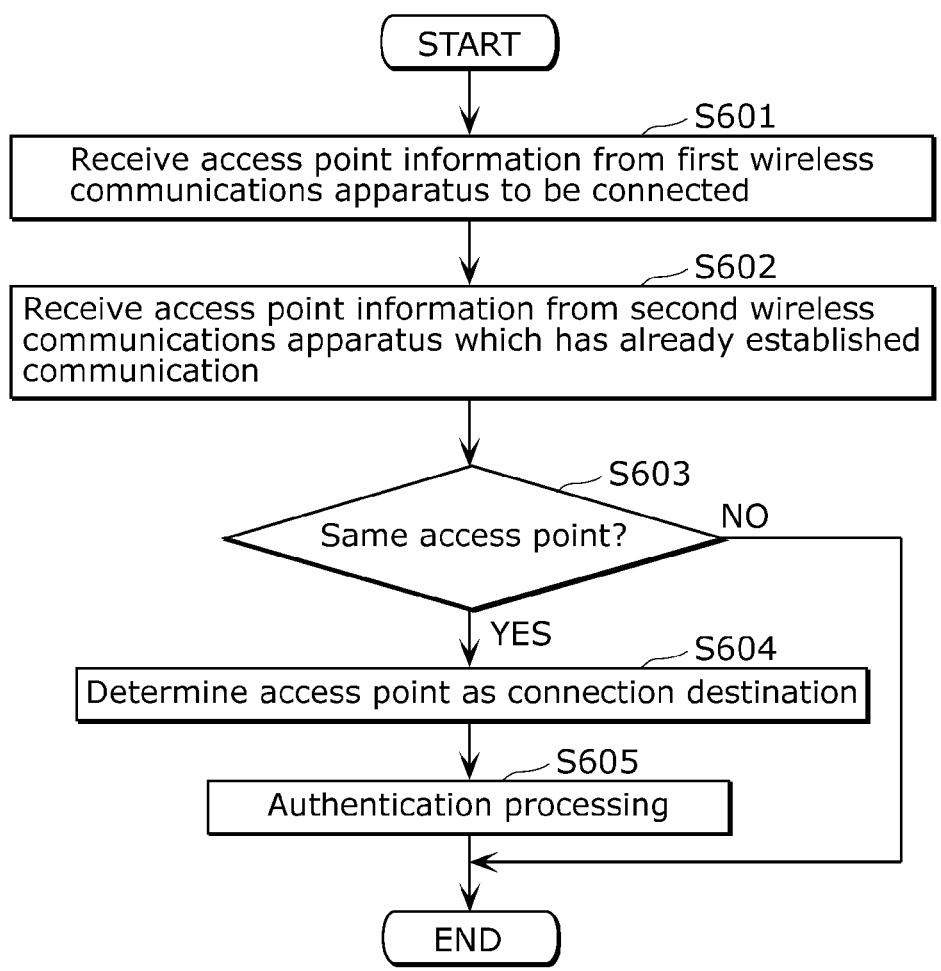
FIG. 40 is a flowchart illustrating processing by a server according to an embodiment.

As described in the above Embodiments 1 to 3, the server 103 according to this embodiment performs wireless connection authentication for establishing communication between a first wireless communications apparatus (the wireless communications apparatus 101) and a wireless access point (the access point 102). The server 103 performs the processing illustrated in FIG. 40.

First, a first receiving unit included in the server 103 receives, from the first wireless communications apparatus (the wireless communications apparatus 101), first access point information (the access point information 664) indicating the first wireless access point (for example, the access point 102 or the access point 102A) (S601). Specifically, the first receiving unit receives a second message (the connection request message 612) including the first access point information (the access point information 664). Furthermore, the second message (the connection request message 612) is transmitted by the first wireless access point (for example, the access point 102 or the access point 102A), according to a first message (the connection request message 611) transmitted from the first wireless communications apparatus (the wireless communications apparatus 101).

Next, a second receiving unit included in the server 103 receives second access point information (the access point information 665), indicating the second wireless access point (the access point 102), from a second wireless communications apparatus (the wireless communications apparatus 105) which has already established communication with the second wireless access point (the access point 102) that is the same as or different from the first wireless access point (the access point 102 or the access point 102A) (S602). Specifically, the second receiving unit receives a fourth message (the participation confirmation message 614 or the participation confirmation message 614A) including the second access point information. Furthermore, the fourth message (the participation confirmation message 614 or the participation confirmation message 614A) is transmitted by the second wireless access point (the access point 102), according to a third message (the participation confirmation message 613 or the participation confirmation message 613A) transmitted from the second wireless communications apparatus (the wireless communications apparatus 105).

It is noted that, as described in Embodiment 1, the step S602 may be executed before the step S601. As described in Embodiment 2, the step S601 may be executed before the Step S602.

Next, a determining unit included in the server 103 compares the first wireless access point indicated in the first access point information with the second wireless access point indicated in the second access point information (S603). Then, if the first wireless access point and the second wireless access point are the same wireless access point (S603: YES), the determining unit determines that the same wireless access point is the connection destination access point that is a wireless access point serving as the connection destination of the first wireless communications apparatus (S604).

Next, an authentication processing unit included in the server 103 executes processing for wireless connection authentication between the above connection destination access point and the first wireless communications apparatus (S605). For example, the authentication processing unit executes processing of the steps S406 to S416 illustrated in FIGS. 24 and 25.

It is noted that the first receiving unit and the second receiving unit are respectively implemented in the form of, for example, the communications unit 401 and the communications control unit 402 illustrated in FIG. 4. Moreover, the determining unit may be implemented in the form of, for example, the determining unit 407 illustrated in FIG. 4. The authentication processing unit may be implemented in the form of, for example, the authentication processing unit 405 illustrated in FIG. 4.

As described above, even though there are multiple wireless access points (for example, the access points 102 and 102A) with which the first wireless communications apparatus (the wireless communications apparatus 101) can communicate, the server 103 can determine a wireless access point to be connected with the first wireless communications apparatus, using the second access point information transmitted by a wireless access point (the access point 102) to be connected according to the third message transmitted from the second wireless communications apparatus (the wireless communications apparatus 105). In addition, the user may carry out the following operations alone: an operation to cause the first wireless communications apparatus to transmit the first message; and an operation to cause the second wireless communications apparatus to transmit the third message. Hence, the user can carry out wireless connection authentication with simple operations.

Moreover, the server 103 receives, from the second wireless communications apparatus, the first code (the authentication code 666) unique to the first wireless communications apparatus. Using the first code, the server 103 generates the second code (the PIN code 667) to be used for wireless connection authentication between the first wireless communications apparatus and the connection destination access point. The server 103 transmits the second code to the connection destination access point. This contributes to preventing an unintended device from being inadvertently authenticated.

In addition, each of the first and second messages further includes the third code (the random number 663). The server 103 generates the second code, using the first code and the third code. It is noted that the third code shall not be limited to the random number 663; instead, the third code may be any given code. This contributes to preventing an unintended device from being inadvertently authenticated.

The communications system according to the embodiments in the present invention has been described above; however, the present invention shall not be limited to these embodiments.

In the above embodiments, the exemplified wireless LAN is of IEEE802.11; instead, these embodiments may be applied to another communications system such as a wireless universal serial bus (USB) or Bluetooth (Registered).

Moreover, these embodiments describe a communications system which executes characteristic processing according to the embodiments; instead, the present invention may be implemented in the form of a wireless communications apparatus, an access point, or a server included in the above communications system. Furthermore, the present invention may be implemented in the form of a communications system, a wireless communications apparatus, an access point, or a wireless connection authentication method for a server.

In addition, in the embodiments, each of the constituent elements may be configured in the form dedicated hardware or may be implemented through execution of a software program suitable to the constituent element. Each constituent element may be implemented as a program executing unit, such as a CPU or a processor, which reads out and executes a software program recorded on a recording medium such as a hard disk or a semiconductor memory. Here, the program below may be the software that implements the server according to each of the embodiments.

In other words, the program causes a computer to execute a wireless connection authentication method used in a server performing wireless connection authentication for establishing communication between a first wireless communications apparatus and a wireless access point. The program causes the computer to execute the following steps: receiving a second message including first access point information (i) transmitted by a first wireless access point according to a first message transmitted from the first wireless communications apparatus, and (ii) indicating the first wireless access point; receiving a fourth message including second access point information (i) transmitted by a second wireless access point according to a third message transmitted from a second wireless communications apparatus which has already established communication with the second wireless access point that is same as or different from the first wireless access point, and (ii) indicating the second wireless access point; comparing the first wireless access point indicated in the first access point information with the second wireless access point indicated in the second access point information, and if the first wireless access point and the second wireless access point are a same wireless access point, determining the same wireless access point as a connection destination access point which is a wireless access point serving as a connection destination of the first wireless communications apparatus; and executing processing for wireless connection authentication between the connection destination access point and the first wireless communications apparatus.

It is noted that the present invention may be the above program, or a non-transitory computer readable recording medium on which the above program is recorded. As a matter of course, the above program may be distributed via a transmission medium such as the Internet.

Moreover, the separation of the functional blocks in a block diagram is an example. Multiple functional blocks may be implemented in the form of a single functional block. A single functional block may be separated into multiple functional blocks. A part of functions may be moved to another functional block. Furthermore, on multiple functional blocks having similar functions, such similar functions may be processed in parallel or in time division by a single hardware or software product.

In addition, an order in which the steps included in the above processing are executed is an example to specifically describe the present invention. The order may be different as far as a similar result is obtained. Furthermore, a part of the above steps may be simultaneously executed with (executed in parallel with) another step.

Hence, a communications system according to one or more implementations has been described based on the embodiments; however, such one or more implementations of the present invention shall not be limited to the embodiments. Unless otherwise departing from the advantages of the one or more implementations, the scope of the one or more implementations may include (i) various modifications which persons skilled in the art arrive at and made to these embodiments, and (ii) a combination of constituent elements in different embodiments.

INDUSTRIAL APPLICABILITY

The present invention is useful as a method for easily establishing a connection with a wireless LAN. Moreover, the present invention can be applied to a use such as a connection to a public wireless LAN.

REFERENCE SIGNS LIST

100 Communications system
101, 105 Wireless communications apparatus
102, 102A Access point
103 Server
104 The Internet
201, 301, 401, 501 Communications unit
202, 302, 402, 502 Communications control unit
203, 303, 403, 503 Apparatus control unit
204, 304, 404, 504 Interface processing unit
205, 305, 505 Wireless parameter setting processing unit
206, 406 Code calculating unit
207, 306, 407, 506 Determining unit
208, 307, 408, 507 Recording unit
209 Output signal strength control unit
210 Timing unit
405 Authentication processing unit
508 Displaying unit
611, 612 Connection request message
613, 614 Participation confirmation message
613A, 614A Participation request message
615A, 615B Authentication code request message
616A, 616B Authentication code information message
617 PIN code information message
618 PIN code generation completion message
619 Protocol start request message
620 Protocol start message
621 Protocol message
622 Protocol end message
623 WPS success message
624A, 624B Connection permission message
651 Operation button
652 Operation menu
653 Input menu
654 Message
661, 671 ID
662, 666 Authentication code
663, 672 Random number
664, 665, 673 Access point information
667 PIN code

The invention claimed is:

1. A wireless connection authentication method used in a server performing wireless connection authentication for establishing communication between a first wireless communications apparatus and a wireless access point, the wireless connection authentication method comprising:
receiving a second message that includes first access point information, the second message being transmitted by a first wireless access point as a result of a first message transmitted from the first wireless communications apparatus, and the second message indicating the first wireless access point;
receiving a fourth message that includes second access point information, the fourth message being transmitted by a second wireless access point as a result of a third message transmitted from a second wireless communications apparatus which has already established communication with the second wireless access point that is same as or different from the first wireless access point, and the fourth message indicating the second wireless access point;
comparing the first wireless access point indicated in the first access point information with the second wireless access point indicated in the second access point information, and if the first wireless access point and the second wireless access point are a same wireless access point, determining the same wireless access point as a connection destination access point which is a wireless access point serving as a connection destination of the first wireless communications apparatus; and
executing processing for wireless connection authentication which causes the first wireless communications apparatus and the connection destination access point to share a code to be used in establishing a wireless connection between the first wireless communication apparatus and the connection destination access point,
wherein the first wireless communications apparatus transmits the first message based on user operation on the first wireless communications apparatus to start the process for wireless connection authentication by the first wireless communications apparatus, and
the second wireless communications apparatus transmits the third message based on user operation on the second wireless communications apparatus to designate, as the connection destination access point of the first wireless communications apparatus, the second wireless access point for which the second wireless communications apparatus has already completed an authentication process for establishing a wireless connection.

2. The wireless connection authentication method according to claim 1, further comprising
receiving, from the second wireless communications apparatus, a first code unique to the first wireless communications apparatus,
wherein the executing of the processing includes:
generating a second code using the first code, the second code being used for the wireless connection authentication between the first wireless communications apparatus and the connection destination access point; and
transmitting the second code to the connection destination access point.

3. The wireless connection authentication method according to claim 2,
wherein each of the first message and the second message further includes a third code, and
in the generating of the second code, the second code is generated using the first code and the third code.

4. A wireless connection authentication method for performing wireless connection authentication between a first wireless communications apparatus and a wireless access point, the wireless connection authentication method comprising:
transmitting a first message to a first wireless access point from the first wireless communications apparatus;
transmitting a second message to a server from the first wireless access point that has received the first message, the second message including first access point information indicating the first wireless access point;
transmitting a third message to a second wireless access point from a second wireless communications apparatus, the second wireless communications apparatus having already completed wireless connection authentication with the second wireless access point which is same as or different from the first wireless access point;
transmitting a fourth message to the server from the second wireless access point that has received the third message, the fourth message including second access point information indicating the second wireless access point;
comparing the first wireless access point indicated in the first access point information and the second wireless access point indicated in the second access point information, and if the first wireless access point and the second wireless access point are a same wireless access point, determining the same wireless access point as a connection destination access point which is a wireless access point serving as a connection destination of the first wireless communications apparatus, the comparing and the determining being performed by the server; and
authenticating wireless connection which causes the first wireless communications apparatus and the connection destination access point to share a code to be used in establishing a wireless connection between the first wireless communication apparatus and the connection destination access point,
wherein the first wireless communications apparatus transmits the first message based on user operation on the first wireless communications apparatus to start the authentication of the wireless connection, and
the second wireless communications apparatus transmits the third message based on user operation on the second wireless communications apparatus to designate, as the connection destination access point of the first wireless communications apparatus, the second wireless access point for which the second wireless communications apparatus has completed an authentication process for establishing a wireless connection.

5. The wireless connection authentication method according to claim 4, further comprising:
obtaining a first code by the second wireless communications apparatus according to a user operation, the first code being unique to the first wireless communications apparatus;
transmitting the first code from the second wireless communications apparatus to the server;
generating a second code by the server using the first code, the second code being used for the wireless connection authentication between the first wireless communications apparatus and the connection destination access point;
transmitting the second code to the connection destination access point from the server; and
generating a fourth code by the first wireless communications apparatus, using a third code which is same as the first code,
wherein in the authenticating, the first wireless communications apparatus and the connection destination access point authenticate the wireless connection between the first wireless communications apparatus and the connection destination access point according to whether or not the second code and the fourth code are same.

6. The wireless connection authentication method according to claim 5, further comprising
generating a fifth code by the first wireless communications apparatus,
wherein each of the first message and the second message further includes the fifth code, in the generating of the second code, the second code is generated using the first code and the fifth code, and
in the generating of the fourth code, the fourth code is generated using the third code and the fifth code.

7. The wireless connection authentication method according to claim 4,
wherein the transmitting of the third message is executed after the transmitting of the first message.

8. The wireless connection authentication method according to claim 7, further comprising
transmitting a wireless signal from the first wireless communications apparatus after transmitting of the first message to the first wireless access point,
wherein, the second wireless communications apparatus transmits the third message to the second wireless access point if the second wireless communications apparatus receives the wireless signal.

9. The wireless connection authentication method according to claim 4,
wherein the transmitting of the first message is executed after the transmitting of the third message.

10. A server which authenticates wireless connection for establishing communication between a first wireless communications apparatus and a wireless access point, the server comprising:
a first receiving unit configured to receive a second message that includes first access point information transmitted by a first wireless access point as a result of a first message transmitted from the first wireless communications apparatus, and the second message indicating the first wireless access point;

a second receiving unit configured to receive a fourth message that includes second access point information transmitted by a second wireless access point as a result of a third message transmitted from a second wireless communications apparatus which has already established communication with the second wireless access point that is same as or different from the first wireless access point, and the fourth message indicating the second wireless access point;

a determining unit configured to compare the first wireless access point indicated in the first access point information with the second wireless access point indicated in the second access point information, and if the first wireless access point and the second wireless access point are a same wireless access point, determine the same wireless access point as a connection destination access point which is a wireless access point serving as a connection destination of the first wireless communications apparatus; and an authentication processing unit configured to execute processing for wireless connection authentication which causes the first wireless communications apparatus and the connection destination access point to share a code to be used in establishing a wireless connection between the first wireless communication apparatus and the connection destination access point, wherein the first wireless communications apparatus transmits the first message based on user operation on the first wireless communications apparatus to start the process for wireless connection authentication, and the second wireless communications apparatus transmits the third message based on user operation on the second wireless communications apparatus to designate, as the connection destination access point of the first wireless communications apparatus, the second wireless access point for which the second wireless communications apparatus has completed an authentication process for establishing a wireless connection.

11. A non-transitory computer-readable recording medium which stores a program that causes a computer to execute a wireless connection authentication method used in a server performing wireless connection authentication for establishing communication between a first wireless communications apparatus and a wireless access point, the wireless connection authentication method comprising:

receiving a second message that includes first access point information, the second message being transmitted by a first wireless access point as a result of a first message transmitted from the first wireless communications apparatus, and the second message indicating the first wireless access point;

receiving a fourth message that includes second access point information, the fourth message being transmitted by a second wireless access point as a result of a third message transmitted from a second wireless communications apparatus which has already established communication with the second wireless access point that is same as or different from the first wireless access point, and the fourth message indicating the second wireless access point;

comparing the first wireless access point indicated in the first access point information with the second wireless access point indicated in the second access point information, and if the first wireless access point and the second wireless access point are a same wireless access point, determining the same wireless access point as a connection destination access point which is a wireless access point serving as a connection destination of the first wireless communications apparatus; and executing processing for wireless connection authentication which causes the first wireless communications apparatus and the connection destination access point to share a code to be used in establishing a wireless connection between the first wireless communication apparatus and the connection destination access point, wherein the first wireless communications apparatus transmits the first message based on user operation on the first wireless communications apparatus to start the process for wireless connection authentication by the first wireless communications apparatus, and the second wireless communications apparatus transmits the third message based on user operation on the second wireless communications apparatus to designate, as the connection destination access point of the first wireless communications apparatus, the second wireless access point for which the second wireless communications apparatus has already completed an authentication process for establishing a wireless connection.

* * * * *